(12) United States Patent
Purkayastha et al.

(10) Patent No.: US 9,463,574 B2
(45) Date of Patent: Oct. 11, 2016

(54) MOBILE INSPECTION ROBOT

(71) Applicant: iRobot Corporation, Bedford, MA (US)

(72) Inventors: Indrajit Purkayastha, North Grafton, MA (US); Michael John Tirozzi, Boston, MA (US); Jason R. Smith, Nashua, NH (US); Kimberly Susanne Monti, Corrales, NM (US)

(73) Assignee: iRobot Corporation, Bedford, MA (US)

( * ) Notice: Subject to any disclaimer, the term of this patent is extended or adjusted under 35 U.S.C. 154(b) by 289 days.

(21) Appl. No.: 13/766,125

(22) Filed: Feb. 13, 2013

(65) Prior Publication Data
US 2013/0231779 A1 Sep. 5, 2013

Related U.S. Application Data

(60) Provisional application No. 61/605,552, filed on Mar. 1, 2012, provisional application No. 61/649,557, filed on May 21, 2012, provisional application No. 61/655,139, filed on Jun. 4, 2012.

(51) Int. Cl.
*B25J 9/16* (2006.01)
*G05D 1/00* (2006.01)
*G05D 1/02* (2006.01)
*H02B 3/00* (2006.01)

(52) U.S. Cl.
CPC ........... *B25J 9/1697* (2013.01); *G05D 1/0088* (2013.01); *G05B 2219/45066* (2013.01); *G05D 1/0274* (2013.01); *G05D 2201/0207* (2013.01); *H02B 3/00* (2013.01)

(58) Field of Classification Search
CPC ......... H02B 3/00; B25J 9/1697; G05D 1/02; G05D 2201/0207; G05B 2219/45066
See application file for complete search history.

(56) References Cited

U.S. PATENT DOCUMENTS 5,319,443 A * 6/1994 Watanabe et al. ............ 356/614
5,350,033 A * 9/1994 Kraft ............................. 180/167
7,706,917 B1 4/2010 Chiappetta et al.
8,306,738 B2 11/2012 Kong et al.
2009/0265035 A1* 10/2009 Jenkinson et al. ............ 700/259
2010/0024191 A1* 2/2010 Ledbetter ........................ 29/428
2011/0054689 A1 3/2011 Nielson et al.
2012/0055765 A1* 3/2012 Zylstra et al. ............. 200/50.24
2012/0078417 A1* 3/2012 Connell, II ................ B25J 5/00
700/248
2012/0305369 A1* 12/2012 Greer et al. ............... 200/50.24

FOREIGN PATENT DOCUMENTS

WO WO-2007041295 A2 4/2007

OTHER PUBLICATIONS

Binhai Wang et al, SmartGuard: An Autonomous Robotic System for Inspecting Substation Equipment, Journal of Field Robotics 29(1), 123-137(2012), first published online Nov. 16, 2011.*
Eigenlance, $20M Order from NAVSEA Keeps iRobot Corp Thriving, Robot Reviews, Aug. 22, 2010.*
Mark Goodman, Methods of Inspection to Determine the Presence of Potential Arc-Flash Incidents, NETA World Spring 2001, pp. 1-6.*
Steve Ellis, BLOG What was R2-D2 Really Saying? Part IX, Dec. 26, 2011.*
Australian examination report for related Application No. 2011256720 dated Mar. 27, 2014.
Canadian Office Action for related Application No. 2,800,372 dated Apr. 2, 2014.

* cited by examiner

Primary Examiner — Abby Lin
(74) Attorney, Agent, or Firm — Honigman Miller Schwartz and Cohn LLP

(57) ABSTRACT

A mobile inspection robot that includes a robot body and a drive system supporting the robot body and configured to maneuver the robot over a work surface. A controller communicates with the drive system and a sensor system. The controller executes a control system that includes a control arbitration system and a behavior system in communication with each other. The behavior system executes an inspection behavior, the inspection behavior influencing execution of commands by the control arbitration system based on sensor signals received from the sensor system to identify and inspect electrical equipment.

30 Claims, 26 Drawing Sheets

MOBILE INSPECTION ROBOT

CROSS REFERENCE TO RELATED APPLICATIONS

This U.S. patent application claims priority under 35 U.S.C. §119(e) to U.S. Provisional Application 61/605,552, filed on Mar. 1, 2012; U.S. Provisional Application 61/649,557, filed on May 21, 2012; and U.S. Provisional Application 61/655,139, filed on Jun. 4, 2012. The disclosures of these prior applications are considered part of the disclosure of this application and are hereby incorporated by reference in their entireties.

TECHNICAL FIELD

This disclosure relates to mobile arc flash inspection robots.

BACKGROUND

Robots are useful in a variety of civilian, commercial, military, and law enforcement applications. For instance, some robots may inspect or search buildings with structural damage caused by earthquakes, floods, or hurricanes, or inspect buildings or outdoor sites contaminated with radiation, biological agents such as viruses or bacteria, or chemical spills. Some robots carry appropriate sensor systems for inspection or search tasks.

In the electrical distribution application applications, are flashing can pose a significant hazard. As a result, standards and operating instructions have been issued for operators to wear Personal Protective Equipment (PPE) to operate breakers, switches and other electrical devices. Depending on the severity of the incident energy in the arc flash, the operator has to wear different category of protective equipment. These protective clothing are cumbersome, difficult from a breathing perspective, and limit the effectiveness of the operator when trying to conduct a precise operation in front of live electrical equipment. Because of these limitations operators either shy away from donning PPE, thus subjecting themselves to risks or tasks take very long.

For some applications historically conducted manually, such as breaker racking, an operator may use a remote breaker racking accessory that opens or closes a circuit breaker in a switchgear system. Some switchgear include front mounted accessories with wires (or radio) capability to close or open a switch with the operator at a safe distance away.

SUMMARY

One aspect of the disclosure provides a mobile inspection robot that includes a robot body and a drive system supporting the robot body and configured to maneuver the robot over a work surface. A controller communicates with the drive system and a sensor system. The controller executes a control system that includes a control arbitration system and a behavior system in communication with each other. The behavior system executes an inspection behavior, the inspection behavior influencing execution of commands by the control arbitration system based on sensor signals received from the sensor system to identify and inspect electrical equipment.

Implementations of the disclosure may include one or more of the following features. In some implementations, the inspection behavior causes the robot to identify a navigation reference, such as a visual fiducial, using the sensor system and maneuver relative to the navigation reference. The inspection behavior may cause the robot to identify the electrical equipment using the navigation reference and execute environmental scans on the identified electrical equipment. In some examples, the inspection behavior causes the robot to identify at least one of a circuit breaker, a contactor, a motor control center, a fuse, a switch, a relay, a capacitor bank, an inverter, a battery bank and obtain an image (e.g., an infrared image) thereof using a camera of the sensor system and/or obtain an ultrasound measurement thereof using an ultrasound sensor of the sensor system.

The robot may include an articulated arm having a pivot end pivotally coupled to the robot body and a distal end. A racking actuator can be disposed on the distal end of the arm. The inspection behavior may cause the robot to identify a circuit breaker using the sensor system, engage the identified circuit breaker with the racking actuator, and move the circuit break between a racked position and unracked position. For example, the racking actuator may engage and turn a lead screw of the circuit breaker. In some implementations, the inspection behavior causes the robot to identify an actuator (e.g., lever arm, button, etc.) of a circuit breaker and actuate the circuit breaker actuator using an articulated manipulator arm disposed on the robot body and in communication with the controller. For a lever arm as the circuit breaker actuator, the robot may move the manipulator arm and a gripper disposed on the manipulator arm to grasp and rotate the lever between open and closed positions. For a button as the circuit breaker actuator, the robot may move the manipulator arm to toggle the button. In some implementations, the inspection behavior causes the robot to identify a switchgear panel and open or close the switchgear panel using an articulated manipulator arm disposed on the robot body and in communication with the controller.

In some examples, the inspection behavior causes the robot to identify a navigation reference using the sensor system, maneuver to a scanning location using the navigation reference and obtain at least one sensor reading using the sensor system of at least one target at the scanning location. The at least one the sensor reading may include at least one of an infrared image, a visual image, temperature, or humidity.

In some implementations, the drive system includes right and left driven tracks. Each track is trained about a corresponding front wheel rotatable about a front wheel axis defined by the robot body. The drive system may also right and left elongated flippers disposed on corresponding sides of the robot body and operable to pivot about the front wheel axis of the robot body. Each flipper has a driven track trained about its perimeter. In other implementations, the drive system includes holonomically driven wheels.

Another aspect of the disclosure provides a method of operating a mobile robot includes driving the robot according to a drive command, maneuvering the robot adjacent electrical equipment, and obtaining a local sensory perception of the electrical equipment using a sensor system of the robot. The method may include capturing at least one image, such as an infrared image of the electrical equipment using a camera of the robot sensor system, obtaining at least one ultrasound measurement of the electrical equipment using an ultrasound sensor of the robot sensor system, obtaining a temperature measurement, and/or obtaining a humidity measurement.

In some implementations, the drive command is issued by a remote operator control unit in communication with the robot. In other implementations, the method includes identifying a navigation reference, such as a visual fiducial, and maneuvering relative to the navigation reference. The method may include identifying the electrical equipment using the navigation reference and executing an environmental scan on the identified electrical equipment.

In other implementations, the method includes receiving the drive command from a control system (e.g., executing on a robot controller) that issues drive commands based on the obtained local sensory perception.

In some implementations, the method includes identifying a switchgear panel in the local sensory perception and opening or closing the switchgear panel using an articulated manipulator arm disposed on the robot. Additionally or alternatively, the method may include identifying a circuit breaker in the local sensory perception, engaging the identified circuit breaker with a racking actuator of the robot, and moving the circuit break between a racked position and unracked position using the racking actuator. The method may include identifying an actuator (e.g., lever arm or button) of a circuit breaker in the local sensory perception and actuating the circuit breaker actuator using an articulated manipulator arm disposed on the robot. For example, for a lever arm as the circuit breaker actuator, the method may include commanding (e.g., via the operator control unit) movement of the manipulator arm and a gripper disposed on the manipulator arm to grasp and rotate the lever between open and closed positions. For a button as the circuit breaker actuator, the method may include commanding movement of the manipulator arm to toggle the button.

In some implementations, the method includes communicating sensor data of the sensor system to a remote computing device, such as a cloud computing service.

The method may include identifying a navigation reference and maneuvering with respect to the navigation reference to a scan location. The method may further include obtaining sensor data from the sensor system for at least one target at the scan location and optionally associating collected sensor data with at least one of the respective target or the scanning location. The method may include moving a scanner payload proximate each target before obtaining the sensor data.

Another aspect of the disclosure provides a mobile inspection robot that includes a robot body, a drive system supporting the robot body and configured to maneuver the robot over a work surface, and a controller in communication with the drive system. The robot also includes a mast disposed on the robot body and arranged substantially vertical with respect to the work surface, and at least one scanner payload disposed on the mast and monitoring environmental parameters about the robot.

In some implementations, the control system includes a control arbitration system and a behavior system in communication with each other. The behavior system executes an inspection behavior that influences execution of commands by the control arbitration system based on sensor signals received from the scanner payload to identify and inspect electrical equipment.

The mast may have an extendible length. The controller may cause the mast to move between a deployed position and a stowed position. In some examples, the controller moves the mast to the deployed position during a data collection mode and the stowed position during a rapid travel mode. Each scanner payload may include at least one of a temperature sensor, a humidity sensor, a visual camera, or an infrared camera. In some examples, the scanner payload(s) includes a camera capable of panning and tilting with respect to the mast. Moreover, the scanner payload(s) may be arranged at a height above the work surface of between about 0.5 ft. and about 8.5 ft.

In some implementations, a first scanner payload is disposed near a distal end of the mast and a second scanner payload is disposed near a proximal end of the mast. A third scanner payload may be disposed on the mast between the first and second scanner payloads. In some examples, the robot includes multiple scanner payloads arranged along the mast in about 2 ft. increments.

In yet another aspect, a method of monitoring environmental parameters includes receiving sensor data from a mobile inspection robot, processing the received sensor data on a computing processor, electronically displaying a model of an environment about the robot, and electronically displaying the processed sensor data.

In some implementations, the sensor data includes at least one of temperature, humidity, air flow, or an image. The model may be a three-dimensional model, a picture, video and/or a robot generated map. The method may include displaying the processed sensor data as an augmented overlay on the model.

The method may include displaying data collection locations on the model, where the data collection locations are drive locations of the robot. Moreover, the method may include displaying one or more targets on the model for each data collection location. Each target may have a different height with respect to the work surface. The method may include displaying sensor data associated with the one or more targets of a data collection location upon receiving a selection event corresponding to that data collection location. Moreover, the method may include displaying sensor data associated with a target upon receiving a selection event corresponding to that target.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Autonomous and semi-autonomous robots can be used to monitor, observe, survey, service, and/or maintain electrical equipment. The robot may operate continuously for a duration of time without human intervention or be teleoperated by a remote user to displace the user from a dangerous situation. In some examples, a remote user teleoperates the robot to service or maintenance electrical equipment in relatively dangerous situations where are flashes are possible. Additionally or alternatively, the robot may operate autonomously to monitor or survey the electrical equipment (e.g., execute sensor scans, such as thermal scans). The electrical equipment may vary from circuit breakers, substations, data centers, server racks, disk drive testing racks, automation, robotic equipment, etc.

Figure 1A:
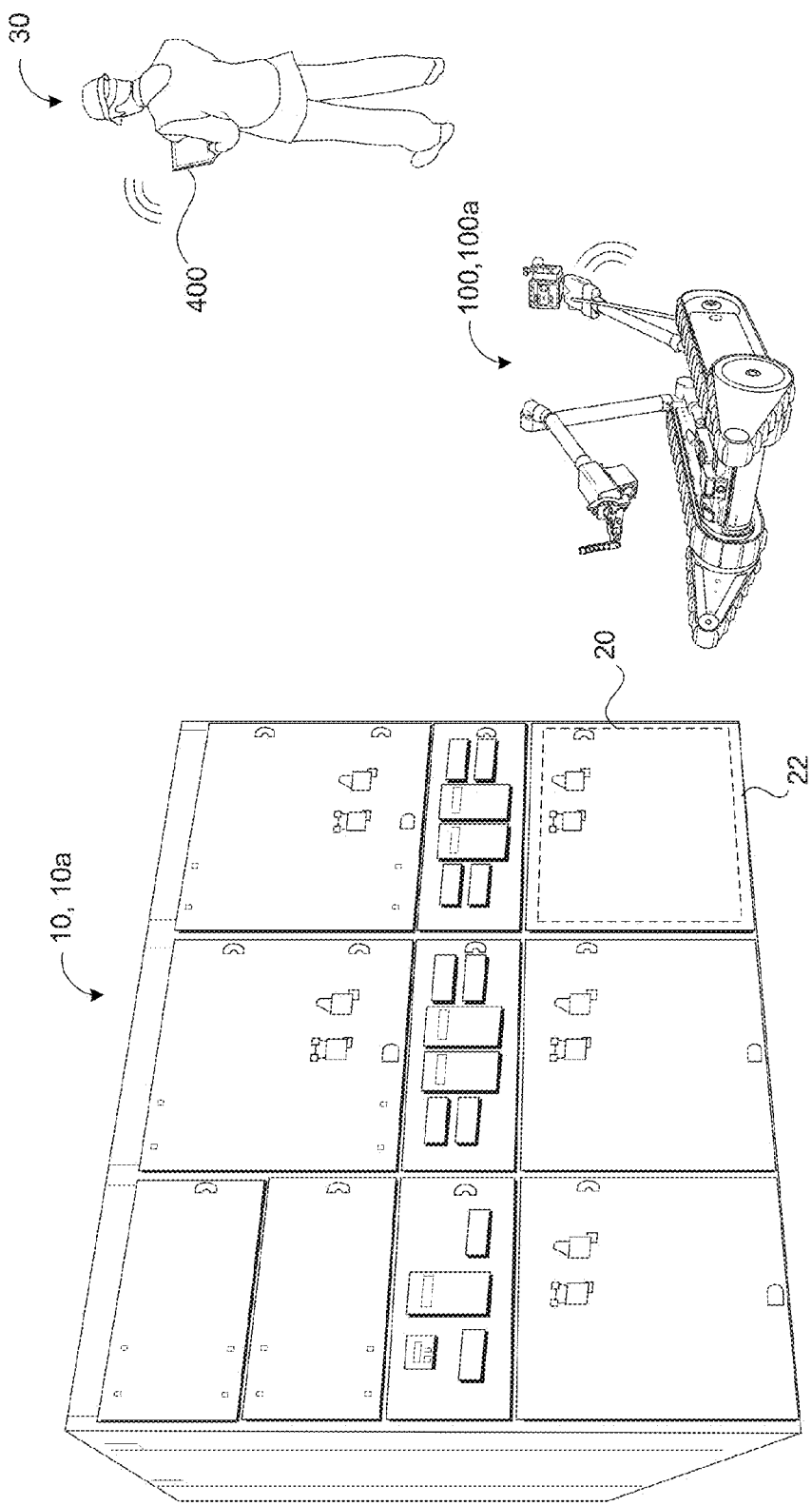
FIG. 1A is a perspective view of an exemplary mobile robot remotely operated near electrical equipment.

Referring to FIG. 1A, racking, unracking, and other maintenance of a circuit breaker 20 in electrical equipment 10, such as switchgear 10a, may result in an arc flash. Arc flashes are generally the result of a rapid release of energy due to an arcing fault between a phase bus bar and another phase bus bar, neutral or a ground. During an arc fault the air is the conductor. Arc faults are generally limited to systems where the bus voltage is in excess of 120 volts. Lower voltage levels normally will not sustain an arc. An arc fault is similar to the are obtained during electric welding and the fault has to be manually started by something creating the path of conduction or a failure such as a breakdown in insulation.

The cause of the short normally burns away during the initial flash and the are fault is then sustained by the establishment of highly conductive plasma. The plasma will conduct as much energy as is available and is only limited by the impedance of the arc. This massive energy discharge burns the bus bars, vaporizing the copper and thus causing an explosive volumetric increase, the are blast, conservatively estimated, as an expansion of 40,000 to 1. This fiery explosion may devastate everything in its path, for example, by creating deadly shrapnel as it dissipates.

The arc fault current is usually much less than the available bolted fault current and below the rating of circuit breakers. Unless these devices have been selected to handle the are fault condition, they will not trip and the full force of an are flash will occur. The transition from arc fault to arc flash takes a finite time, increasing in intensity as the pressure wave develops. The challenge is to sense the arc fault current and shut off the voltage in a timely manner before it develops into a serious arc flash condition.

Rather than subjecting a human to the potential occurrence of an arc flash, a robot 100, 100a may be used. Mobile robots 100 having semi-autonomous or autonomous capabilities may execute behaviors on one or more computing processors to perform certain tasks or operations, such as racking/unracking circuit breakers 20, engaging/disengaging (opening/closing) circuit breakers 20, navigation and obstacle avoidance. Moreover, a robot 100 may be teleoperatively driven by a remote user 30 from one location to another, allowing the user to remain a safe distance from the circuit breaker 20 or switchgear 10a.

Figure 1B:
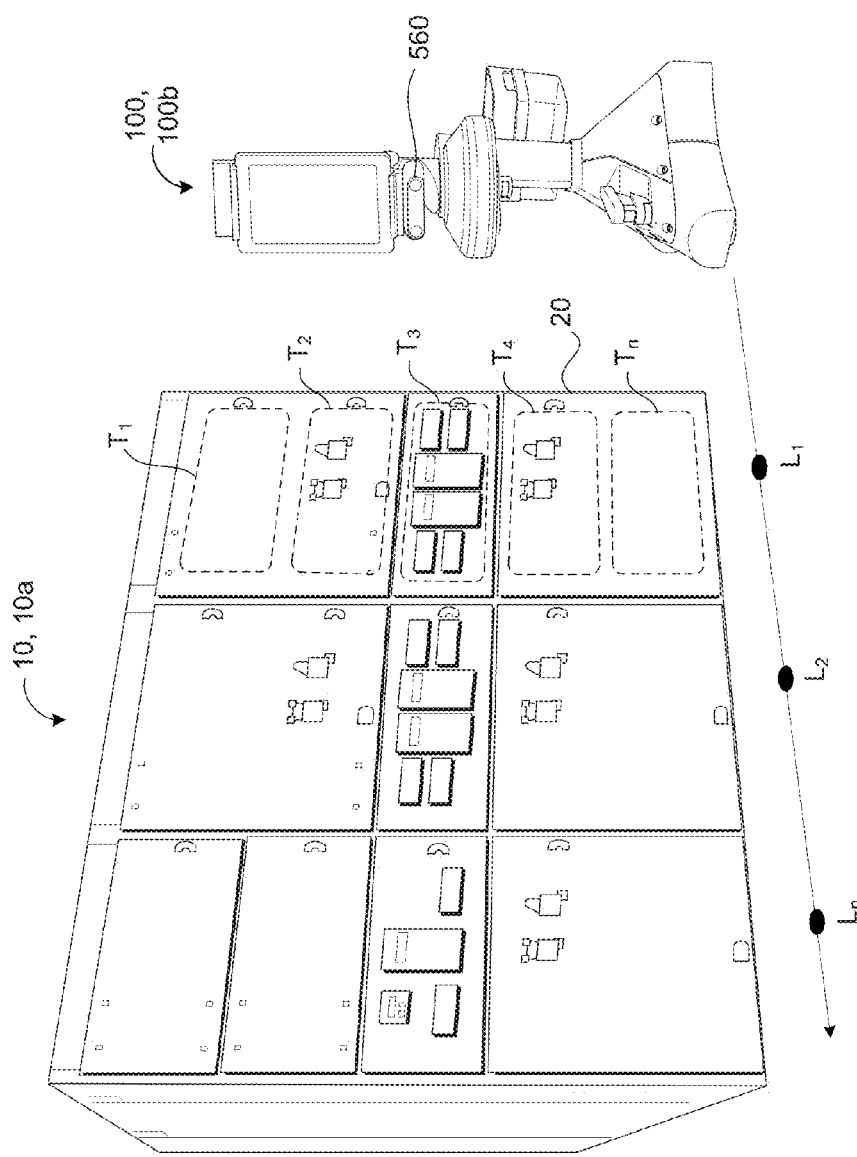
FIGS. 1B-1D are perspective views of an exemplary mobile robot operating autonomously near electrical equipment.
Figure 1C:
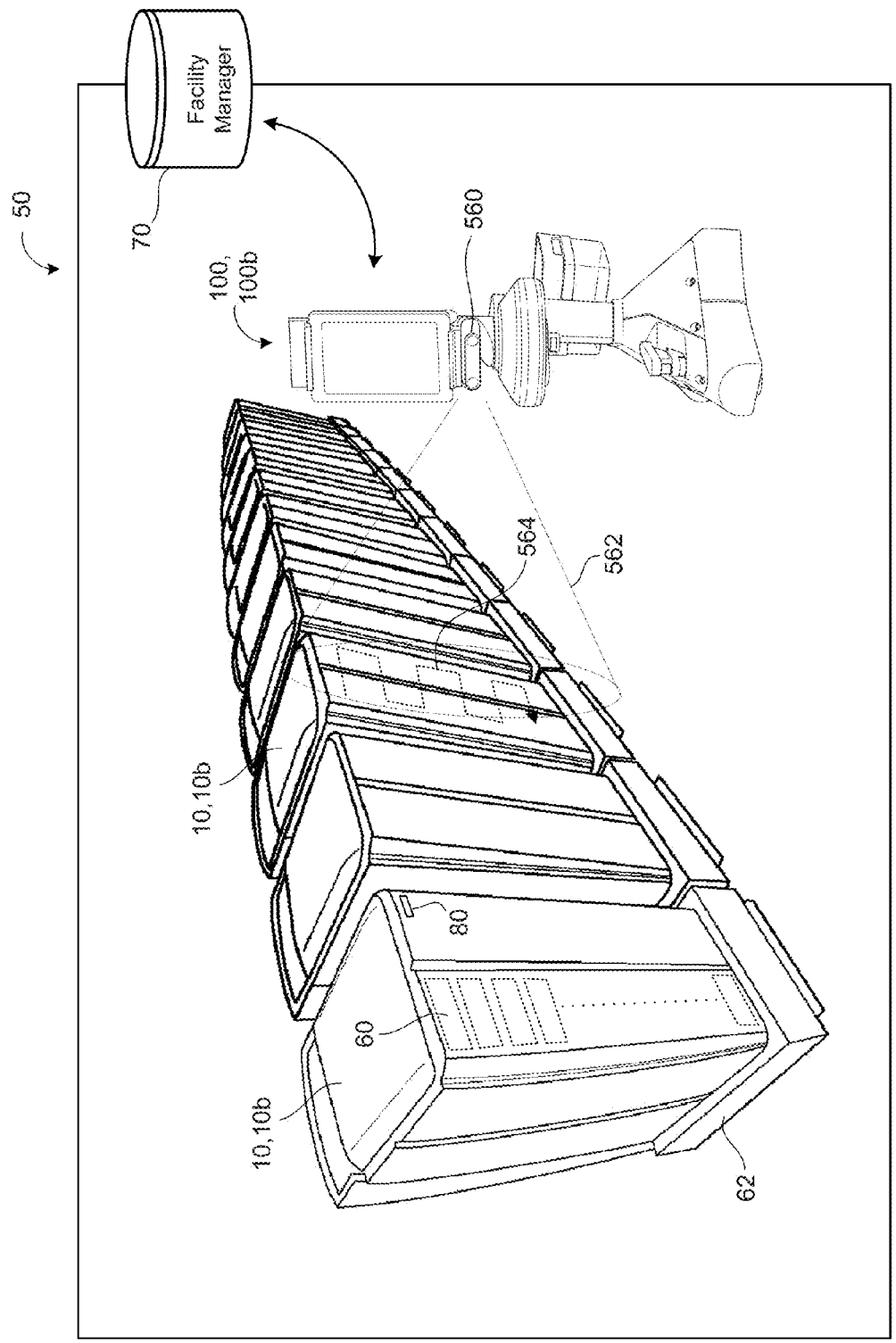
Figure 1D:
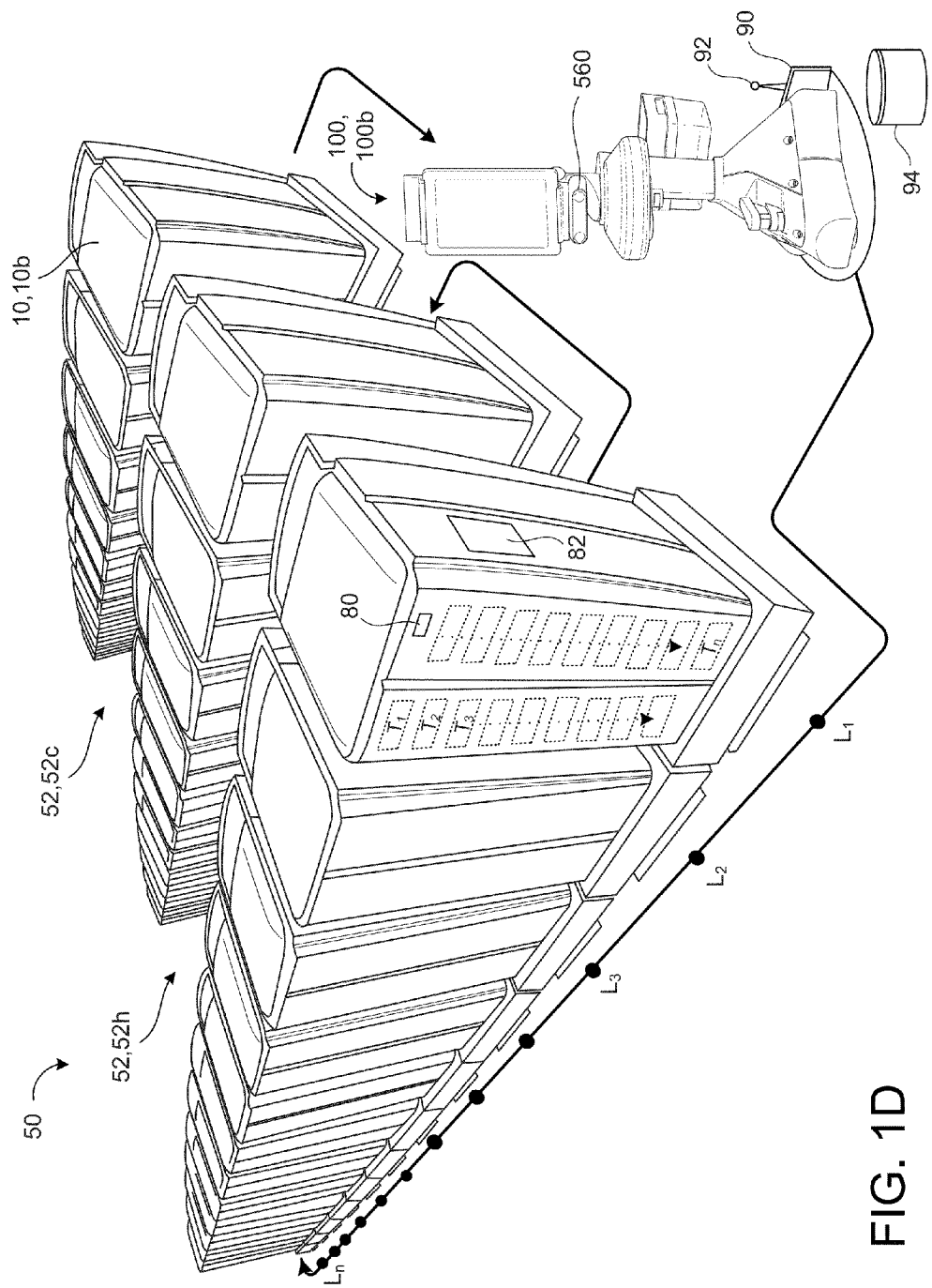

Referring to FIGS. 1B-1D, in some implementations, a mobile robot 100, 100b may be used to monitor or observe electrical equipment 10, such as switch gear 10a and/or data center equipment 10b, in a data center 50. The robot 100, 100b may autonomously navigate about the data center 50 taking sensor readings, which can be communicated to a remote user for live or later viewing and analysis.

Facility managers 70 ensure no unplanned events by conducting regular (e.g. annual) inspection of the electrical equipment 10 using thermal scanning techniques, and by monitoring the temperature and humidity across a facility. Robots 100 can provide an economical alternative to manual inspections or audits, and can help ensure the facility meets the stringent availability requirements imposed on data center operators in two ways: by safely inspecting the data center's electrical supply equipment and by regularly monitoring the environmental conditions (temperature, humidity, etc.) inside the server room itself. Moreover, the use of robots 100 may save money by reducing the need for outside thermographers for electrical maintenance inspections, and by reducing the facility's electricity consumption by using thermal monitoring to enable slightly elevated operating temperatures in the server room.

Data centers 50 generally require highly reliable electrical power (often at the megawatt level or higher) to run servers 60 and necessary supporting environmental controls. Maintaining the required level of reliability often involves the use of outside thermographers hired at significant annual expense as part of a broader set of maintenance procedures. The data center 50 may also maintain the environment around the servers 60 within strict temperature and relative humidity limits with extremely tight deviation tolerances. The power required to maintain these environmental conditions can be a significant cost driver for the operating expenses of the facility as a whole, and small increases of the environmental limits can result in significant annual operating cost savings.

Because the reliability of the electrical supply system 10a is critical to the proper functioning of the data center 50, regular inspections and maintenance of the electrical equipment 10 (circuit breakers, electrical joints, etc.) are normally conducted to ensure that degradations over time do not lead to a supply failure. Prior to performing annual maintenance, a thermal scan is often conducted on the electrical equipment 10 after the panels have been opened or removed. Generally, the most efficient thermal scans are conducted on fully energized equipment at 80% of normal load or higher. Due to the voltages involved with portions of the electrical supply system this has an inherent danger of are flash incidents. Personnel conducting these scans are required to wear appropriate Personal Protective Equipment (PPE) and to have additional support personnel present and on standby. Also, because thermal scanning is a highly specialized skill, data center operators routinely hire outside thenmographers to conduct the thermal scans. At a large data center 50 this can cost tens of thousands of dollars for a multi-day thermal scanning operation of energized electrical supply equipment. Robots 100 can autonomously perform these thermal scans without requiring outside thermographers on-site. In addition, since the robot 100 is positioned in front of energized equipment (rather than a human technician), there is a significantly lower level of danger and fewer personnel may be required for the task.

In the example shown in FIG. 1B, the robot 100 navigates to locations $L_n$ to perform environmental scans, such as thermal scans, on the electrical equipment 10, 10a. The robot 100 may execute environmental scans directed at and/or positioned adjacent tone or more target $T_n$ at each location $L_n$. The robot 100 may collect environment scan data locally (e.g., stored in memory) for a given mission and then off load the data (e.g., wired or wireless communication) to the facility manager 70 at the end of the mission. By storing the collected data locally on the robot 100, versus continuous wireless communication to a remote device, such as the facility manager 70, the robot 100 does not introduce unnecessary noise into the environment of the data center 50. In other applications, such as where noise is not an issue, the robot 100 may communicate the environmental scan data continuously or after each scan to a remote device, such as the facility manager 70 or a cloud service.

Reliable server operations are critical to the proper functioning of the data center 50, so environmental conditions about the servers 60 may be closely controlled, and the power consumption to remove heat from the servers 60 can be significant (e.g., it may approach 50% of the electricity bill of the whole facility). Significant cost savings in the form of reduced power consumption may be realized if the average air temperature can be slightly elevated, but not at the expense of reduced server reliability. Data center operators may experiment with variations of the environmental conditions about their servers 60 to decrease energy consumption.

Data center equipment 10b generally requires temperature control. For example, storage media and/or computing processors may need to operate within a specific temperature range to avoid error, damage or failure. The equipment 10b may be routinely serviced or replaced. New equipment may need to operate at different temperatures than the previous equipment. Moreover, a first piece of electrical equipment 10b may need to operate within first temperature range different from a second temperature range of a second piece of electrical equipment 10b. The robot 100 may execute routine thermal scans of the electrical equipment 10, 11b. A facility manager 70 (e.g., person, computer, or robot) may use the thermal scan data to adjust settings on a cooling system 62, for example for rack servers 60. In some examples, the facility manager 70 may adjust the cooling system 62 to maintain a temperature within a threshold range of an upper temperature limit of each piece of electrical equipment 10b, individually (e.g., cooling per piece of equipment) and/or the lowest upper temperature of all pieces of electrical equipment 10b. This allows the facility manager 70 to minimize cooling and save energy costs.

The facility manager 70 may need to monitor the temperatures of different locations within the data center 50. Data center infrastructure management (DCIM) systems may not be sufficient. DCIM is the integration of information technology (IT) and facility management disciplines to centralize monitoring, management and intelligent capacity planning of a data center's critical systems. The facility manager 70 may need identify hot air aisles 52h and cold air aisles 52c as well temperatures of individual servers 64 and/or clusters, power distribution unit (PDU) panels, and/or rack panels. Manually determining these temperatures across a large data center 50 can be tedious and extremely labor intensive. Moreover, the fidelity of these readings may suffer with time due to human error. The robot 100 can provide accurate and consistent temperature readings as well as variances across the data center facility. The facility manager 70 may use the robot 100 to safely conduct thermal scans on energized electrical equipment 10 without human intervention (e.g., by a thermographer) by removing panels 22 from the electrical equipment 10 to be scanned and commanding the robot 100 to locate and scan points of interest.

The robot 100 can be programmed to maneuver autonomously or using a map to traverse aisles 52 of the data center 50, stop in front of the electrical equipment 10b (e.g., server racks), and perform scans for parameters of interest (e.g., temperature, humidity, electrical arcing, static discharge, etc.). The robot 100 may measure the parameters at different heights and repeat the measurements as necessary. The robot 100 may not require any human involvement or radio transmissions.

Although the data center 50 may be equipped with fixed temperature and humidity monitoring sensors, these may not always provide adequate information to the data center operator. Use of the robot 100 for environmental monitoring allows data to be collected at a much wider number of locations than is often provided for in fixed installations, and the system is easily reconfigurable as the data center is upgraded or reconfigured FIGS. 2-5 illustrate an exemplary mobile robotic vehicle or robot 100 that may be used to rack and unrack circuit breakers 20 and/or engage/disengage (open/close) circuit breakers 20. Although the robot 100 shown includes a track driven drive system having flippers, other mobility platforms, configurations and morphologies are possible as well, such as wheel driven platforms, crawling or walking platforms, etc. The robot 100 can be designed to move about in a variety of environments, including an urban environment of buildings (including staircases), streets, underground tunnels, building ruble, and in vegetation, such as through grass and around trees. The robot 100 may have a variety of features which provide robust operation in these environments, including impact resistance, tolerance of debris entrainment, and invertible operability.

Examples of various tracked robotic vehicles or robots are shown and described in U.S. Pat. Nos. 6,431,296, 6,263,989, 6,668,951 and 6,651,885. The disclosures of these patents are considered part of the disclosure of this application and are hereby incorporated by reference in their entireties. The aforementioned patents describe the construction of various tracked robotic vehicles having driven flippers and articulated robotic components.

Referring to FIGS. 2-6, the robot 100, 100a includes a main body 110 (or chassis) having a drive system 115 supported by the main body 110. The main body 110 has right and left sides 110a, 110b as well as a leading end 110c, a trailing end 110d and a center of gravity $CG_M$. In the example shown, the main body 110 includes right and left rigid side plates 112a, 112b disposed parallel to each other. At least one transverse support 114 rigidly couples the right side place 112a to the left side plate 112b. An articulator shaft 116 at the leading end 110c of the main body provides additional transverse support between the right and left side plates 112a, 112b. The rigid components are designed for strength and low weight and can be made from a material such as 7075-T6 aluminum. Alternative versions of the robot 100 can use other materials, such as other lightweight metals, polymers, or composite materials. The robot 100 may be electrically powered (e.g. by a bank of standard military BB-2590 replaceable and rechargeable lithium-ion batteries).

In some implementations, the drive system 115 includes right and left driven track assemblies 120a, 120b (also referred to as the main tracks 120) mounted on the corresponding right and left sides 110a, 110b of the main body 110 and having right and left driven tracks 122a, 122b, respectively. Each driven track 122a, 122b is trained about a corresponding front wheel, 124a, 124b, which rotates about a drive axis 15. The tracks 122a, 122b provide a relatively large traction area (e.g., covering a foot print of the main body 110 and the tracks 122a, 122b), allowing the robot 100 to traverse varied terrain, such as cables, stairs, uneven surfaces, etc. Although the robot 100 is depicted as having skid steer driven tracks, other drive systems are possible as well, such as differentially driven wheels, articulated legs, etc.

Figure 2:
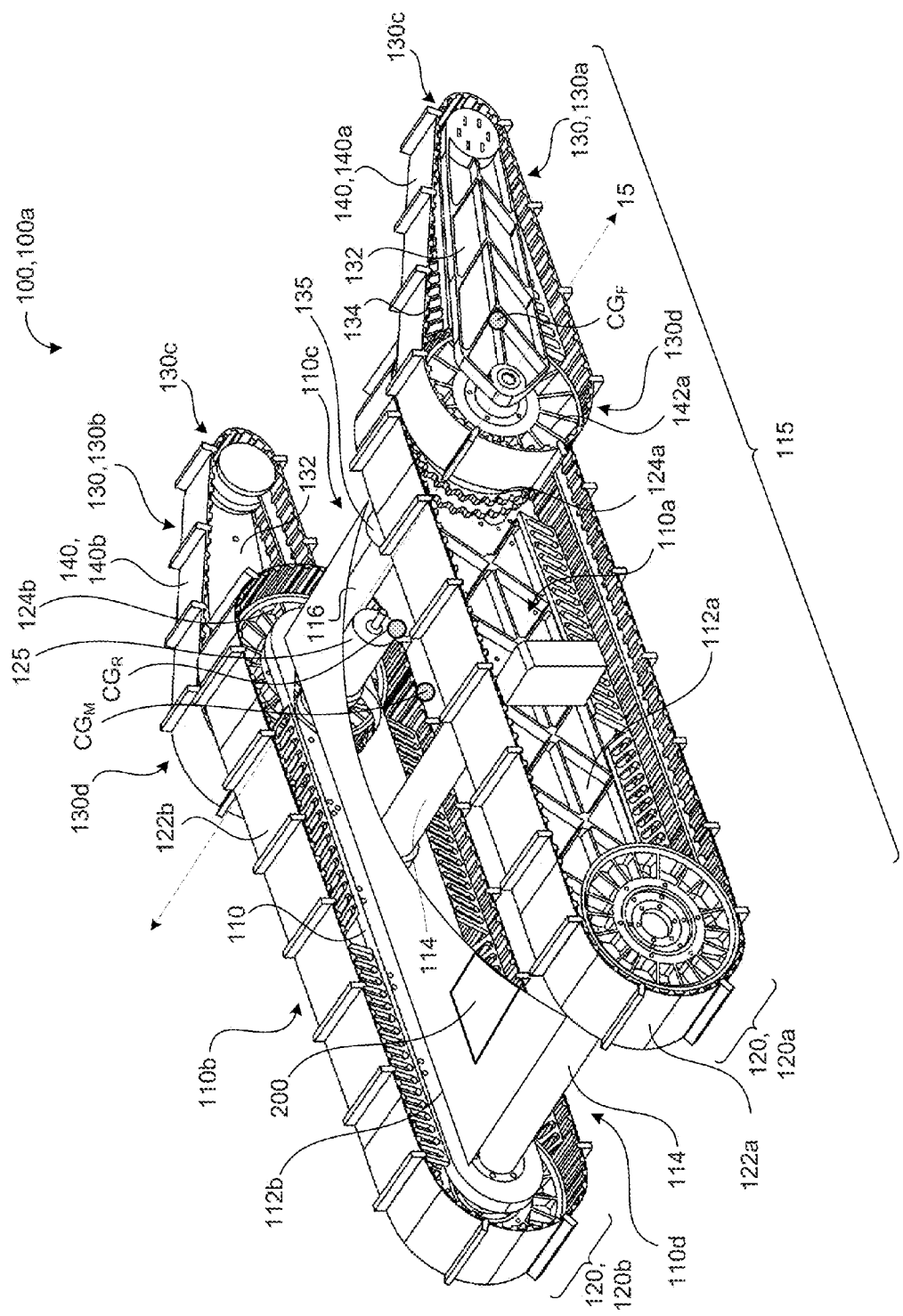
FIG. 2 is a rear perspective view of an exemplary robot.
Figure 3:
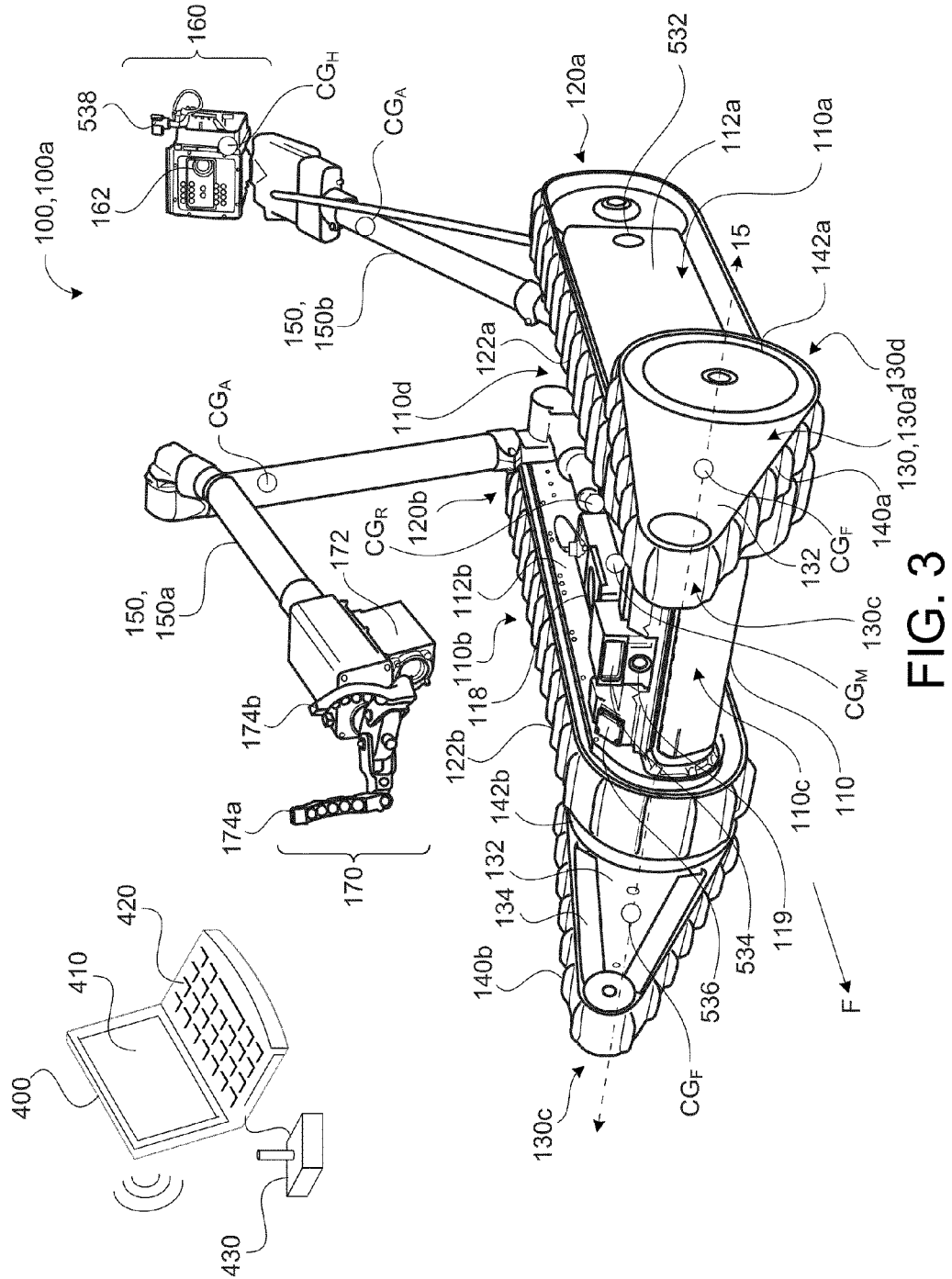
FIG. 3 is a front perspective view of an exemplary robot.
Figure 4:
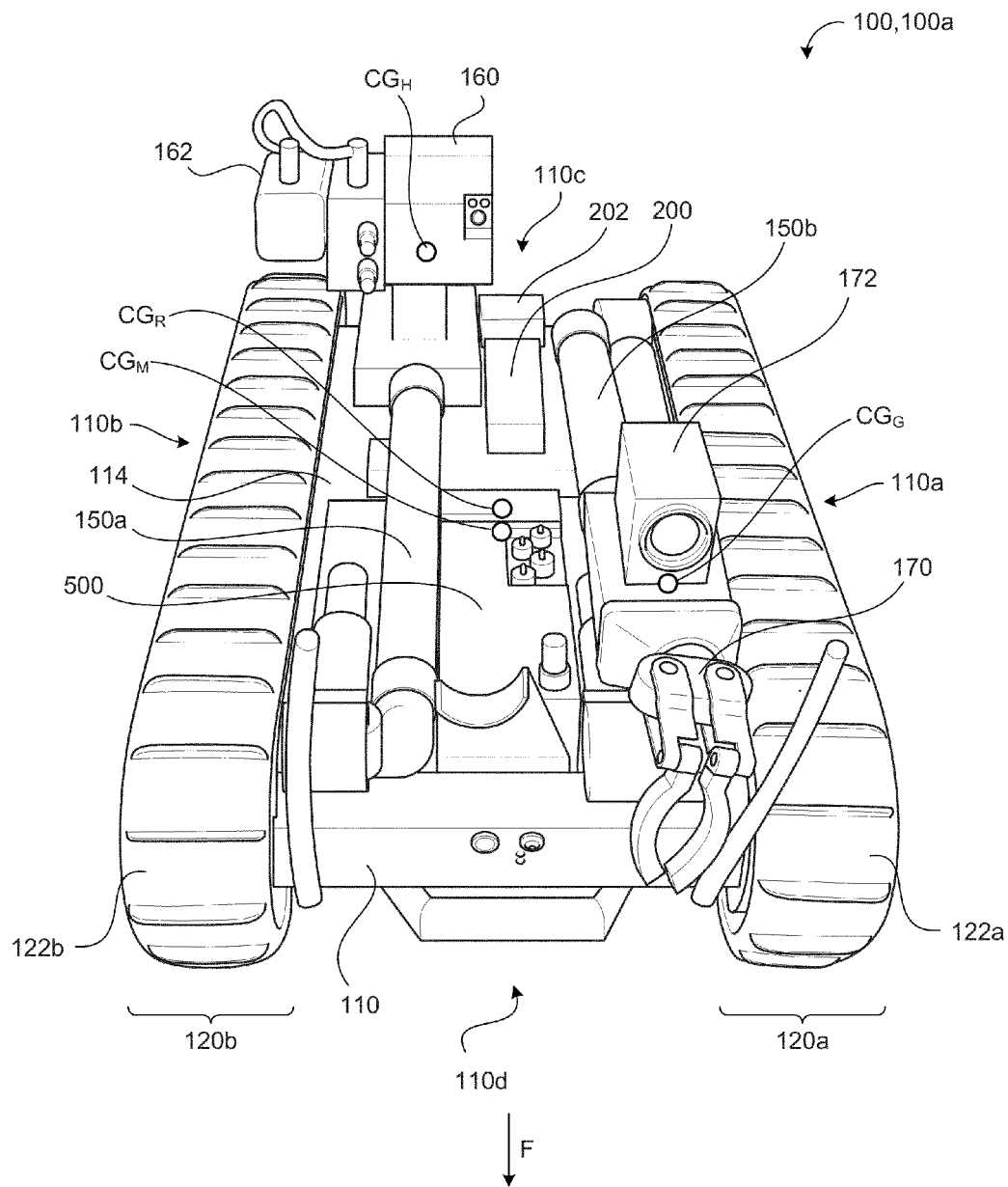
FIG. 4 is a rear view of an exemplary robot.
Figure 5:
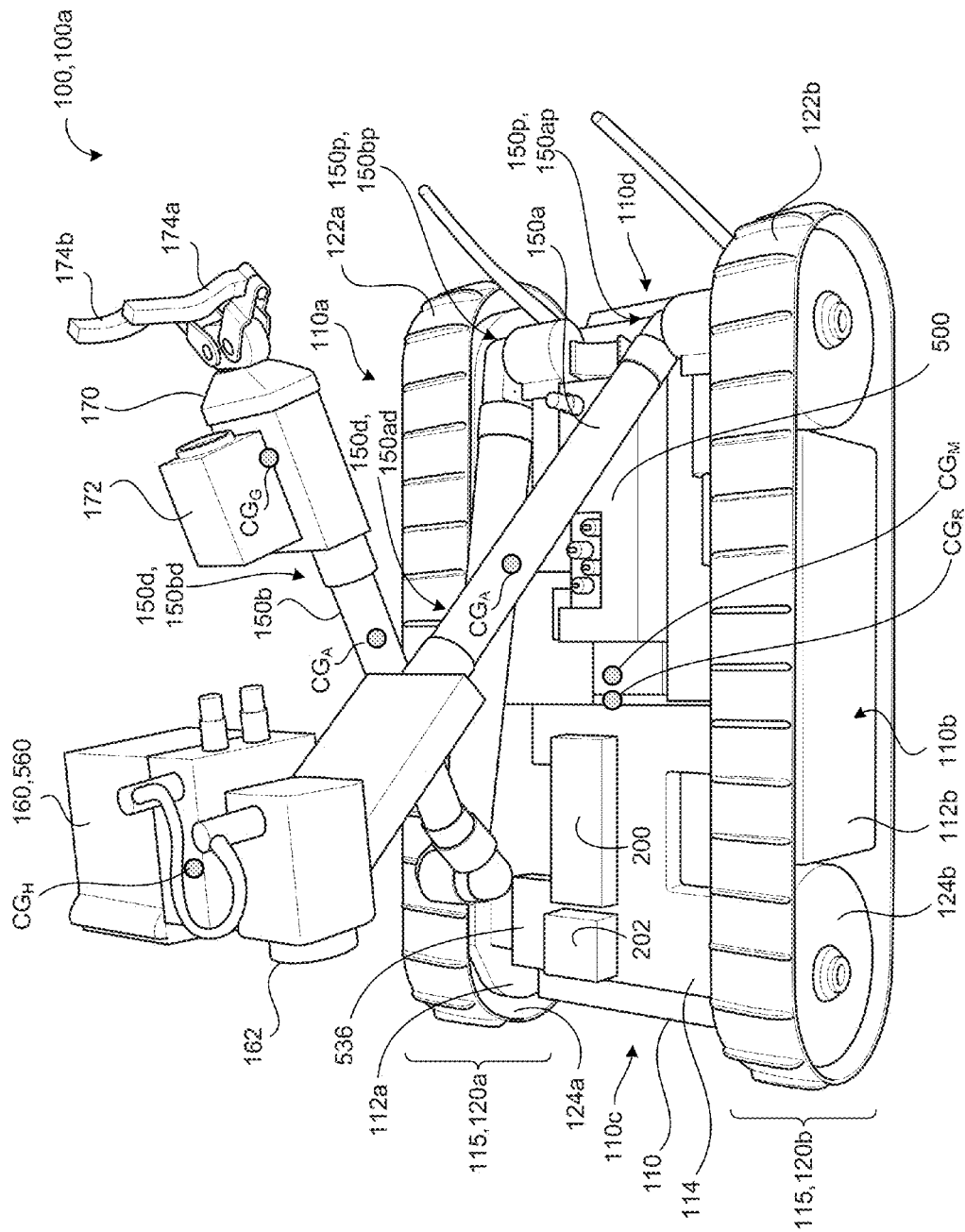
FIG. 5 is a side perspective view of an exemplary robot.
Figure 6:
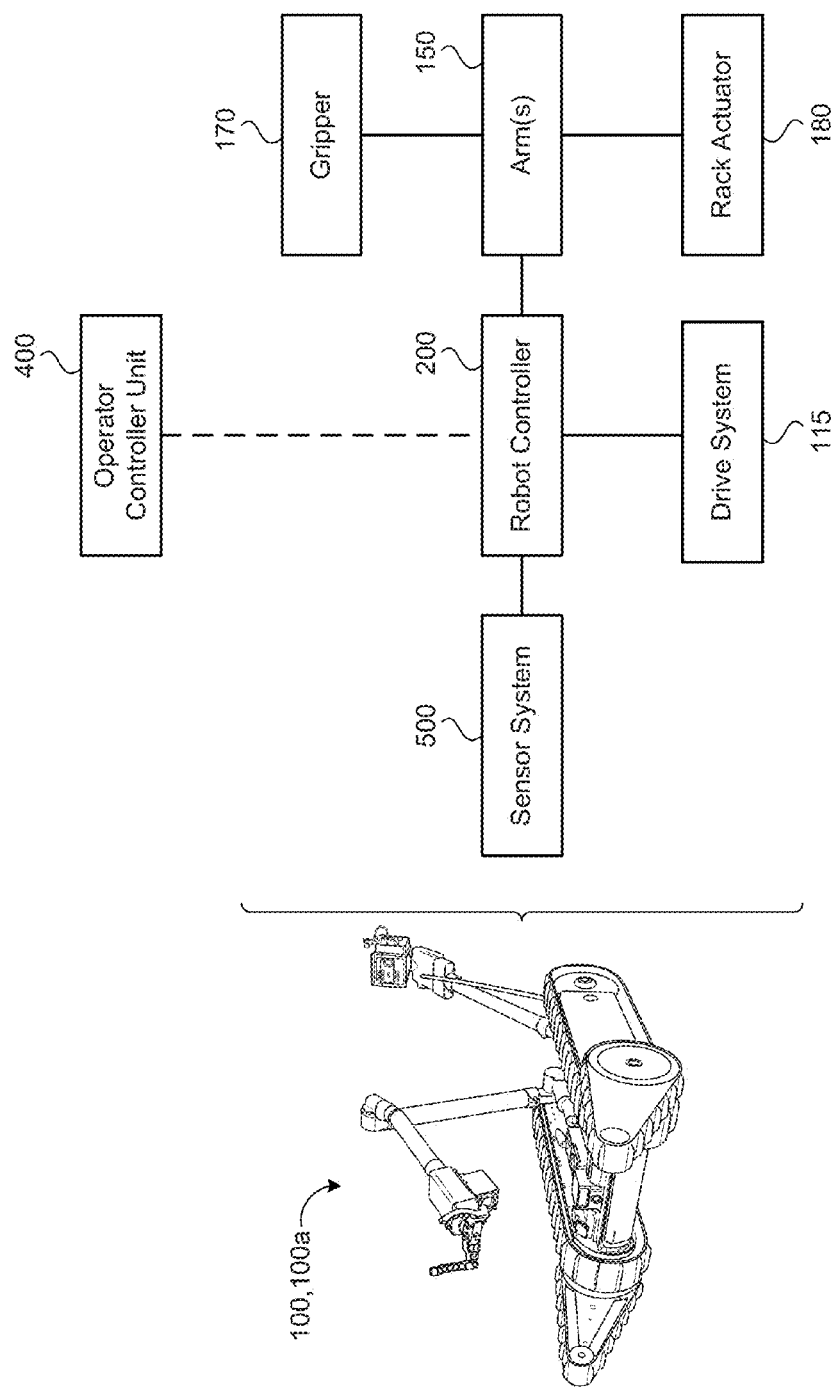
FIG. 6 is a schematic view of an exemplary robot.

In the examples shown in FIGS. 2 and 3, the robot 100 includes at least one extendable flipper 130 mounted on the main body 110. In the examples shown in FIGS. 4 and 5, the robot 100 is depicted without any flippers 130, but may be configured to releasable receive one or more flippers 130 onto the main body 110 (e.g., onto and concentric with one of the front drive wheels 124a, 124b at the leading end 110c of the main body 110). Referring again to FIGS. 2 and 3, the robot 100 includes right and left flippers 130a, 1301b, which are shown in a fully extended configuration extending beyond the front or leading end 110c of the main body 110. The flippers 130, 130a, 130b each have a distal end 130c, a pivot end 130d, and a flipper center of gravity $CG_F$ between the distal and pivot ends 130c, 130d. Each flipper 130, 130a, 130b pivots about a drive axis near the leading end 110c of the main body 110. Moreover, each flipper 130, 130a, 130b may have a driven flipper track 140, 140a, 140b trained about flipper drive wheel 142a, 142b, which is driven about the drive axis 15 at the pivot end 130d of the flipper 130a, 130b. In the example shown, flipper track supports 134 disposed on a flipper side plate 132 of the flipper 130 support the corresponding flipper track 140. In some implementations, the flippers 130, 130a, 130b can be rotated in unison in a continuous 360 degrees between a stowed position, in which the flippers 130a, 130b are next to the right and left side plates 112a, 112b of the main body 110, and at least one deployed position, in which the flippers 130a, 130b are pivoted at an angle with respect to the main tracks 122a, 122b. The center of gravity $CG_R$ of the robot 100 can be contained within an envelope of the 360 degree rotation of the flippers 130a, 130b.

In some implementations, the flipper side plates 132 of the respective right and left flippers 130a, 130b are rigidly coupled to one another through the articulator shaft 116 to move together in unison. In other implementations, the flippers 130a, 130b pivot independently of each other. The combination of main tracks assemblies 120a, 120b and flippers 130, 130a, 130b provide an extendable drive base length to negotiate gaps in a supporting surface. In some examples, the right main tack 122a and the right flipper track 140a are driven in unison and the left main tack 122b and the left flipper track 1401b are driven in unison to provide a skid steer drive system.

The main body 110 may include one or more cameras 118, 119 disposed near the leading end 110c of the main body 110 and may be positioned to have a field of view directed forward and/or upward. The camera(s) 118, 119 may capture images and/or video of the robot environment for navigating the robot 100 and/or performing specialized tasks, such as racking and unracking circuit breakers 20, observing and analyzing electrical equipment, etc.

The robot 100 may include one or more arms 150, 150a, 150b (e.g., articulated arms) each having a pivot end 150p, 15ap, 150bp pivotally coupled to the main body 110 and a distal end 150d, 150ad, 150bd that may be configured to receive a head 160 or a gripper 170. In some implementations, the robot 100 includes first and second arms 150a, 150b each having a pivot end 150ap, 150bp pivotally coupled to the main body 110. Both arms 150a, 150b may be attached at a common location or region of the main body 110, such as the leading end 110c or the trailing end 110d (as shown) of the main body 110, the arms 150a, 150b can be disposed at opposite ends of the main body 110 as well. For example, the pivot end 150ap of the first arm 150a can be attached near the trailing end 110d of the main body 110 and the pivot end 150bp of the second arm 150b can be attached near the leading end 110c of the main body 110. The arms 150a, 150b may be coupled to the main body 110 in a manner that allows the arms 150a, 150b to be stowed along the main body 110 in a compact configuration and pivot in opposite directions away from main body 110 to allow a wider range of CG-shifting, for example, to negotiate obstacles. A head 160 is mounted on the distal end 150ad of the first arm 150a and a gripper 170 is mounted on the distal end 150bd of the second arm 150b. In the example shown, the gripper 170 includes a gripper camera 172 and first and second opposing fingers or tongs 174a, 174b for grasping objects.

Each arm 150a, 150b has an arm center of gravity $CG_A$ and the head 160 has a center of gravity $CG_H$. The head 160 may include a camera 162 (e.g., visible light and/or infrared camera), radar, LIDAR (Light Detection And Ranging, which can entail optical remote sensing that measures properties of scattered light to find range and/or other information of a distant target), LADAR (Laser Detection and Ranging), a communication device (radio frequency, wireless, etc.), and/or other components. The robot 100 may move the first arm 150a to position the head camera 162 to view switchgear 10 and/or a circuit breaker 20 and obtain an infrared image/thermal scan and/or ultrasound measurement thereof to evaluate the potential of any arc flashes.

In general, the robot 100 may maintain a relatively low center of gravity $CG_R$ (e.g., within an envelope of the main body 110), which allows the robot 100 to articulate the first arm 150a with the gripper 170 (e.g., having five degrees of freedom) to manipulate the electrical equipment 10 (e.g., push/pull a circuit breaker 20, open a panel 22, move an obstacle, etc.) and/or view the electrical equipment 10 with the gripper camera 172, e.g., to obtain a thermographic scan of the electrical equipment 10 for evaluating a potential for arc flashes.

In some implementations, the robot 100 includes a controller 200 in communication with the drive system 115 and any arm(s) 150, 150a, 150b and head(s) 160 or gripper(s) 170 mounted on the arm(s) 150, 150a, 150b. The controller 200 may issue drive commands to one or more motors 125 driving the main tracks 120 and the flipper tracks 140. Moreover, the controller 200 may issue rotational commands to a flipper motor 135 to rotate the flippers 130 about the drive axis 15. The controller 200 may include one or more computer processors and associated memory systems.

Referring again to FIG. 2, the controller 200 of the robot 100 may include a communication system 202, which includes, for example, a radio to communicate with a remote operator control unit (OCU) 400 to receive commands and issue status and/or navigation information. The OCU 400 may include a display (e.g., LCD or touch screen) 410, a keyboard 420, and one or more auxiliary user inputs 430, such a joystick or gaming unit. The OCU 400 allows an operator or user to control the robot 100 from a distance. In some examples, the user can select different levels of human control over the robot 100, ranging from a teleoperation mode, in which the user directly controls the motors and actuators on the robot 100, to autonomous operation, in which the user passes higher-level commands to the robot 100. In partially autonomous operation, the robot 100 can perform tasks such as following a perimeter or wall, recovering from getting stuck in an opening or due to high centering on an obstruction, evading a moving object, or seeking light.

Referring to FIGS. 1 and 7-9, in some implementations, while standing at a safe distance from switchgear 10, the operator 30 maneuvers the robot 100 to a position proximate a circuit breaker 20 using the OCU 400 in the teleoperation mode or a semi-autonomous mode. In the semi-autonomous mode, the robot 100 may execute a navigation behavior causing the robot 100 to react in one of several ways in a given situation due to a perceived local perception of its surroundings based on one or more sensor signals from a sensor system. For example, while executing an object detection obstacle avoidance (ODOA) behavior, the robot 100 may react to avoid a perceived obstacle when a user remotely operates and drives the robot 100 towards that obstacle. Additionally or alternatively, while operating in an autonomous or semi-autonomous mode, the robot 100 may execute a wall following behavior, where the robot 100 tries along a wall, such as a row of circuit breakers 20, while maintaining a threshold distance away from the wall. While driving next to the circuit breakers 20, the robot 100 may use the camera 162 to obtain a thermal scan (e.g., infrared images or video) of the circuit breakers to monitor for potentially hazardous conditions, such as potential arc flashes. In some examples, the robot 100 may capture other types of imagery of the circuit breakers (or any other items viewed by the camera(s) 118, 119, 162, 172), such as visible light images, stitched images, video, infrared images, etc. In some examples, the camera(s) is a thermal camera (e.g., 64 pixels) capable of detecting a temperature range of −20° C. to +100° C.

The OCU 400 allows the user to teleoperate the robot 100 and/or receive and view sensory feedback from the robot 100. For example, the OCU 400 may analyze and display sensor data (e.g., as a graphical representation). Moreover, the user can view images and/or video of an object viewed by the camera(s) 118, 119, 162, 172.

Switchgear 10 can be found in electrical substations, which are generally part of an electrical generation, transmission, and distribution system. Substations transform voltage from high to low, or the reverse, or perform any of several other important functions. Electric power may flow through several substations between a generating plant and a consumer, and its voltage may change in several steps. Switchgear 10 may include one or more circuit breakers 20, each of which may move between a racked position and an unracked position (e.g., for maintenance).

Typically, the circuit breaker 20 can be moved between the racked and unracked positions by actuating a corresponding lead screw 25. For example, turning the lead screw 25 in a clockwise (CW) direction causes the circuit breaker 20 to move into its racked position, while turning the lead screw 25 in a counterclockwise (CCW) direction causes the circuit breaker 20 to move to its unracked position.

Using the OCU 400, the operator 30 may remotely control the robot 100 to maneuver the robot 100 proximate electrical equipment, such as switchgear 10 or a circuit breaker 20, while staying a safe distance away (e.g., 80-100 feet away) to perform a maintenance mission. While approaching or upon reaching a threshold distance to the switchgear 10, the operator 30 may command the robot 100 to obtain a local sensory perception of the switchgear 10 using a sensor system 500 (FIG. 6) of the robot 100 to evaluate any hazardous conditions. The local sensory perception may include camera images and/or video (e.g., visual and/or infrared spectrums, three-dimensional images, etc.), capacitive sensing, ultrasonic sensing, etc. If the maintenance mission entails evaluating a likelihood of arc flashing, the remote operator 30 may obtain infrared images of the circuit breaker 20, for example, by using the head camera 162 and/or other cameras 118, 119, 172 on the robot 100. The robot controller 200 may process the infrared images to determine a probability for arc flashing. In some examples, the OCU 400 displays a visual indication of a likelihood of arc flashing (e.g., a dial or graduated bar) on the screen 410. Moreover, the camera(s) 118, 119, 162, 172 allow the operator 30 to remotely monitor circuit breaker settings without having to stand in front of the equipment. The robot 100 may obtain other observatory metrics of its surroundings using the sensor system 500.

Figure 7:
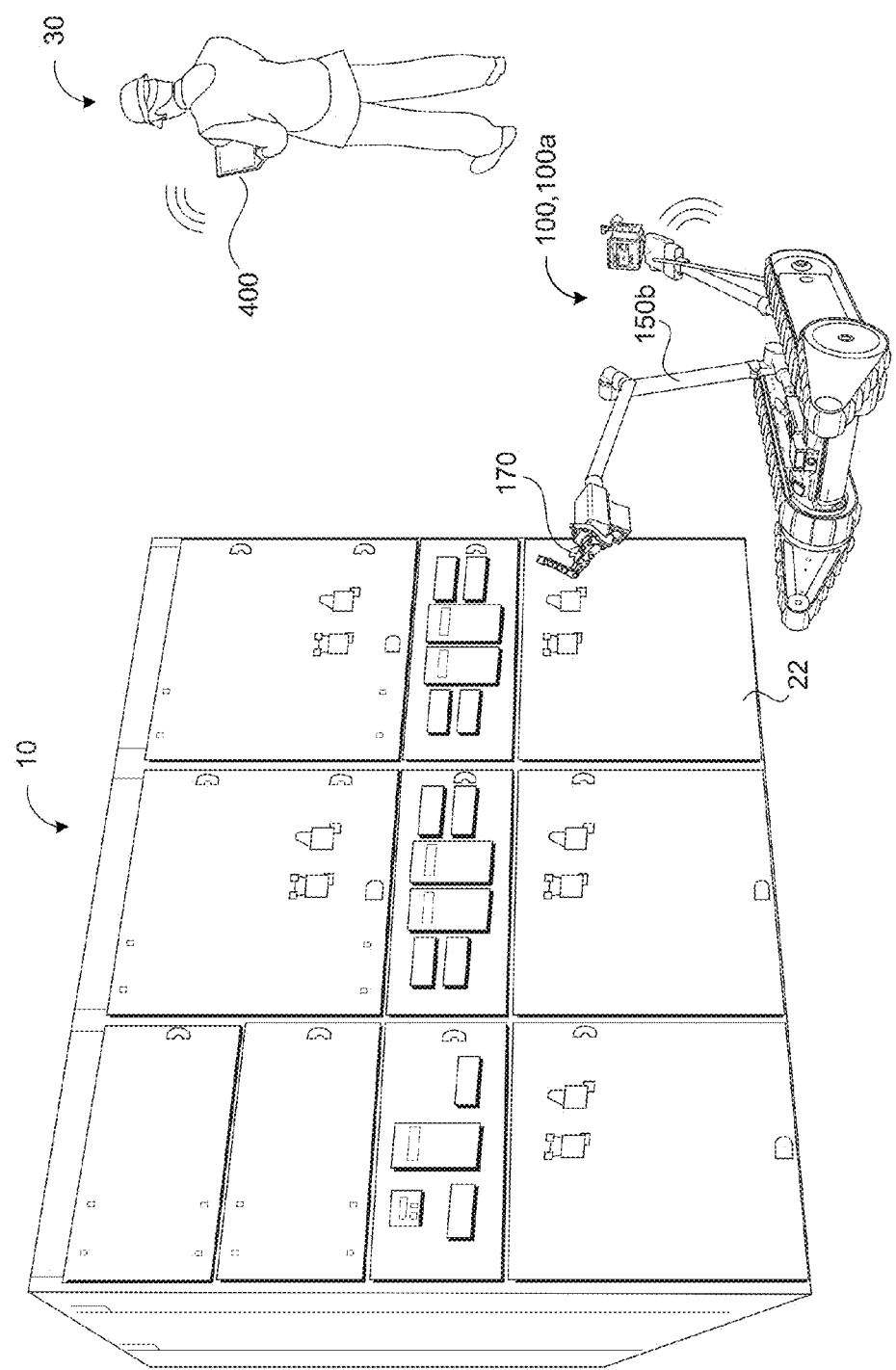
FIG. 7 is a perspective view of an exemplary mobile robot remotely operated to grasp a handle of a switchgear panel.
Figure 8:
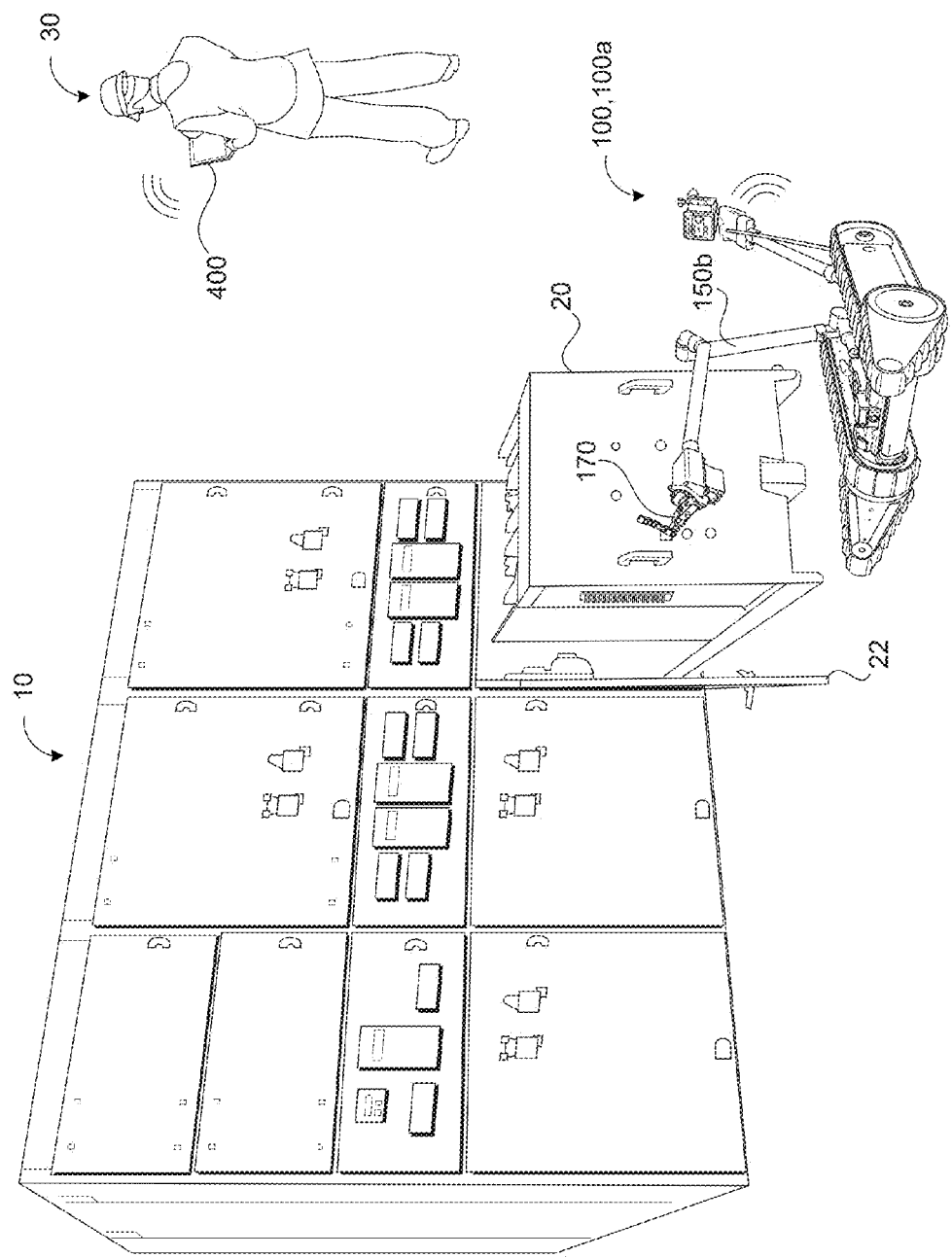
FIG. 8 is a perspective view of an exemplary mobile robot remotely operated to unrack a circuit breaker.

Referring to FIGS. 7 and 8, the operator 30 may remotely command the robot 100 (using the OCU 400) to maneuver itself adjacent the switchgear 10 and move the second arm 150b to position and move the gripper 170 to grasp and open a switch gear panel 22, exposing a circuit breaker 20 for maintenance.

Figure 9:
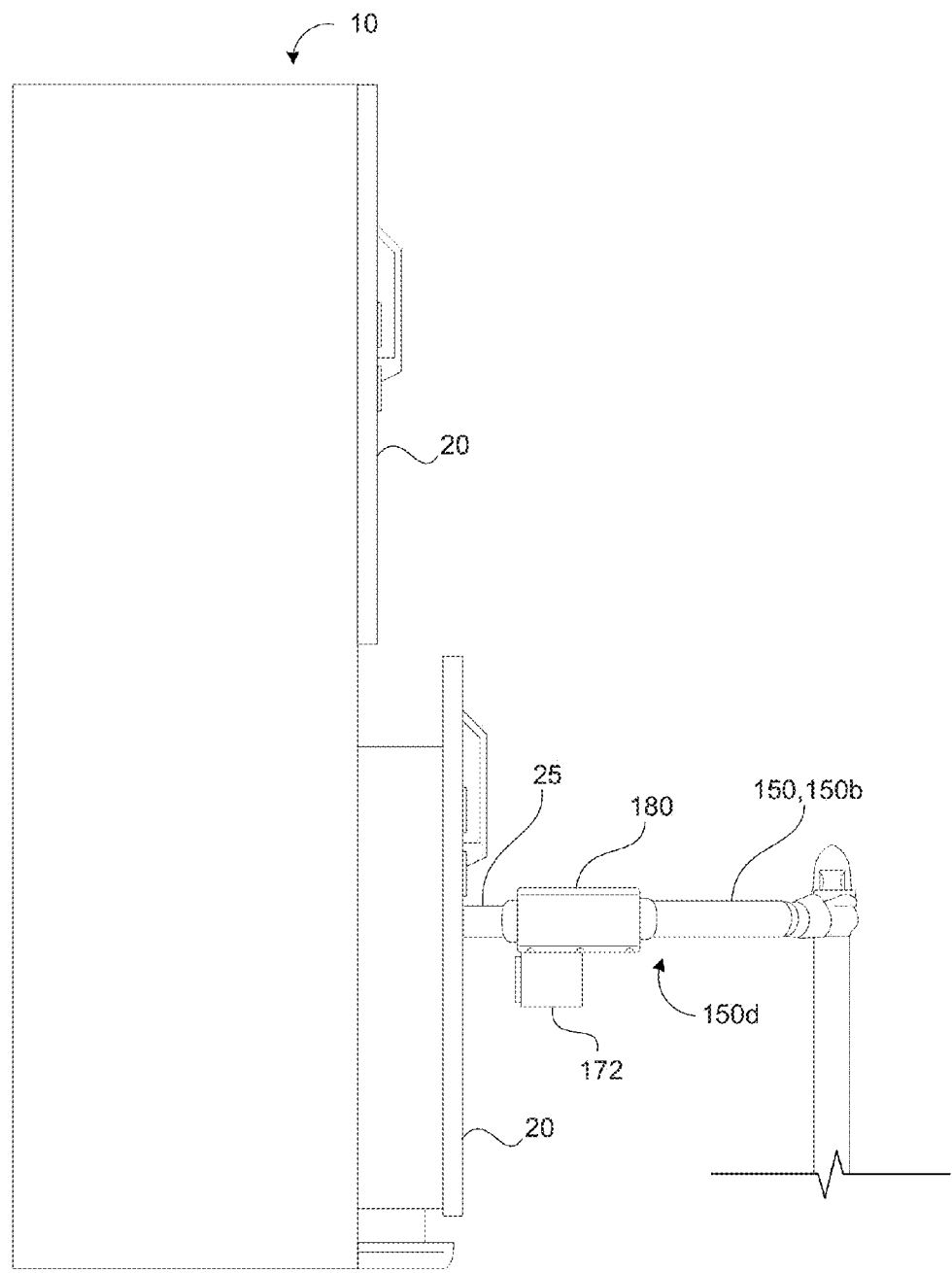
FIG. 9 is a side view of a rack actuator disposed on a robot manipulator arm and engaging a circuit breaker.

Referring to FIG. 9, in some implementations, the robot 100 includes a racking actuator 180 disposed on the distal end 150d of an arm 150. The racking actuator 180 may be configured to engage the circuit breaker lead screw 25 to rotate the lead screw 25 in clockwise or counterclockwise directions for racking or unracking the circuit breaker 20. Additionally or alternatively, the robot 100 may use the gripper 170 to engage and turn the circuit breaker lead screw 25. The remote operator 30 may command the robot 100 to move its arm 150 to position the gripper 170 or rack actuator 180 to engage the circuit breaker lead screw 25 to move the circuit breaker 20 between its racked and unracked positions, mitigating the potential harm of a human worker performing that task.

Figure 10A:
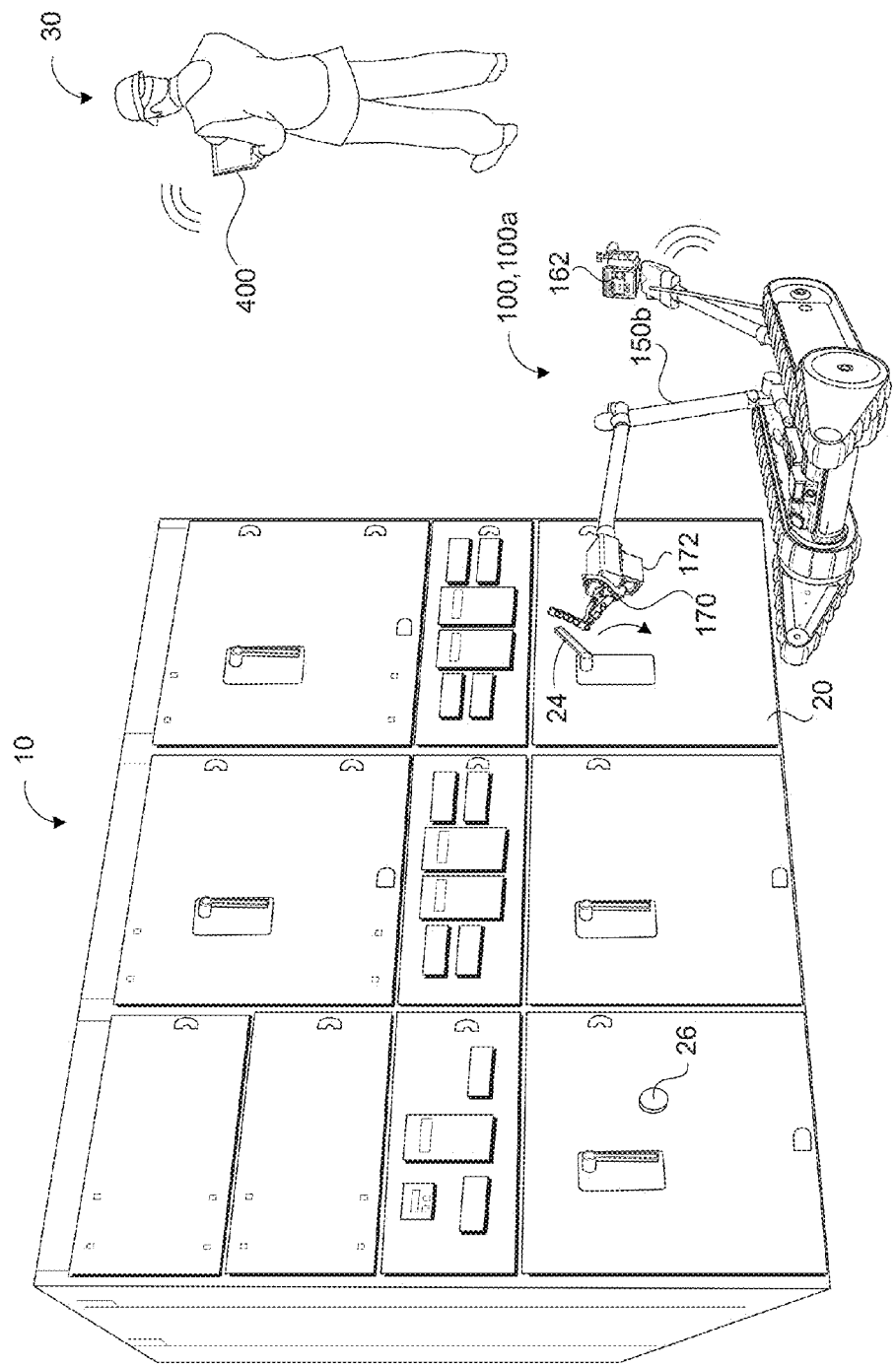
FIGS. 10A and 10B are perspective views of an exemplary mobile robot remotely operated to rotate a lever arm on a circuit breaker between open and closed positions.
Figure 10B:
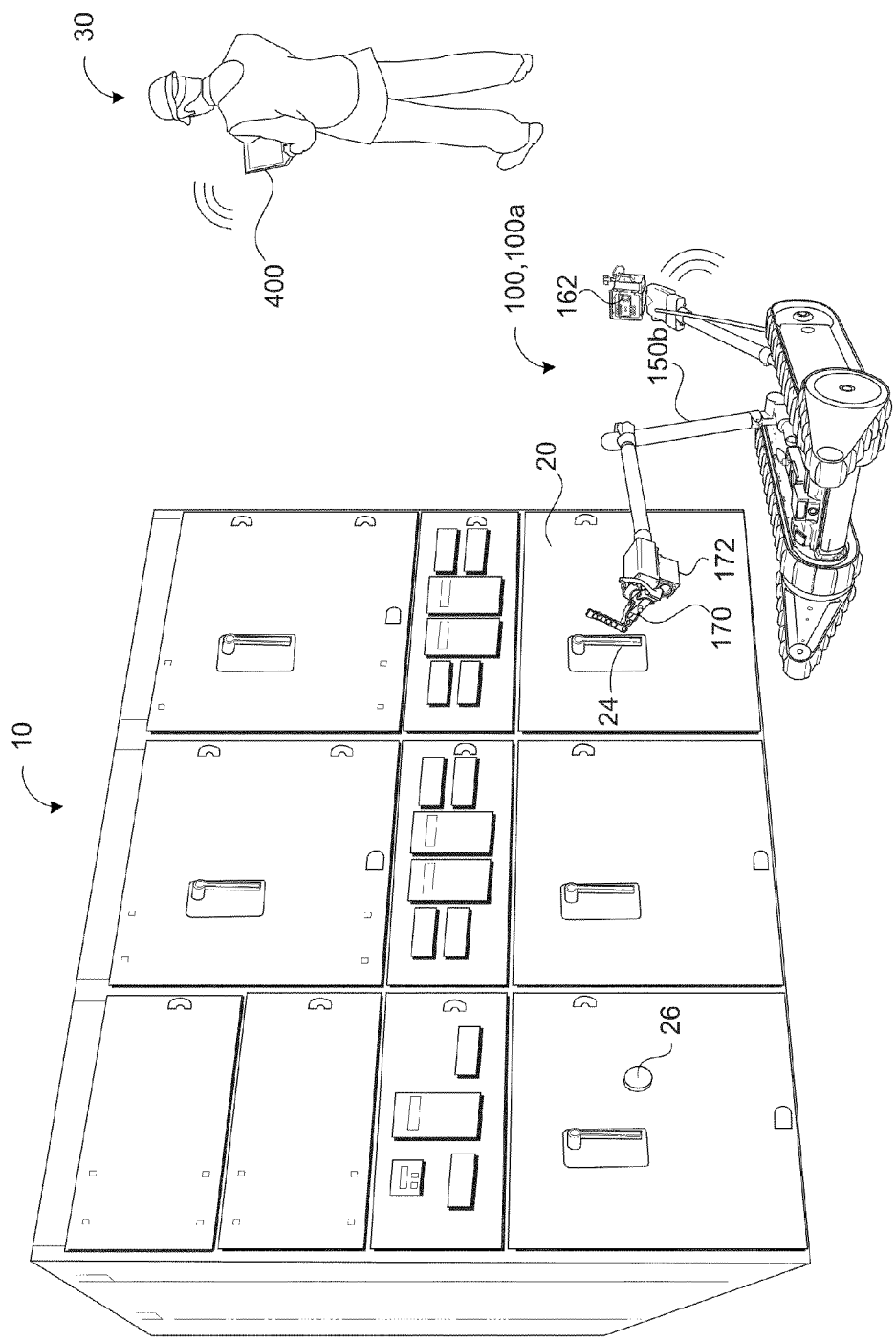

Referring to FIGS. 10A and 10B, depending upon the type of circuit breaker 20, the circuit breaker 20 may be engaged (i.e., turned on, or closed) and disengaged (i.e., turned off, or opened) by actuating a corresponding lever 24 or button 26. For example, the circuit breaker 20 may become engaged by moving a corresponding lever arm 24 between it disengaged position and an engaged position. Similarly, for other types of circuit breakers, the circuit breaker 20 may become engaged or disengaged by toggling a button 26. Like moving the circuit breaker 20 between its racked and unracked positions, engaging/disengaging the circuit breaker 20 may, in some circumstances, result in an arc flash. To mitigate the potential harm to a human worker, the robot 100 may be used to perform such tasks. For engaging/disengaging the circuit breaker 20, the remote operator may command the robot 100 (via the OCU 400) to grasp and turn the corresponding lever arm 24 or push the corresponding button 26, using the second arm 150b and associated gripper 170. The remote operator 30 may view the circuit breaker 20 and the lever arm 24 or button 26 using the head camera 162 and/or the gripper camera 172.

The robot 100 may be used to observe and/or interact with all sorts of electrical equipment, such as, but not limited to circuit breakers, contactors, motor control centers, fuses, switches, relays, capacitor banks, inverters, battery banks, etc. For example, the robot 100 may maneuver adjacent electrical equipment (e.g., autonomously or remotely commanded through the operator control unit 400 by a remote operator) to observe the electrical equipment using one or more of the cameras 118, 119, 162, 172 and/or manipulate the electrical equipment using one or more of its arms 150. The robot 100 may observe and/or interact with other hazardous items or situations, including, but not limited to, chemical hazards, fire hazards, machine automation, etc.

Referring to FIGS. 2-6, to achieve reliable and robust autonomous or semi-autonomous movement, the robot 100 may include a sensor system 500 having several different types of sensors. The sensors can be used in conjunction with one another to create a perception of the robot's environment (i.e., a local sensory perception) sufficient to allow the robot 100 to make intelligent decisions about actions to take in that environment. The sensor system 500 may include one or more types of sensors supported by the robot body 110, which may include obstacle detection obstacle avoidance (ODOA) sensors, communication sensors, navigation sensors, etc. For example, these sensors may include, but not limited to, proximity sensors 532, contact sensors, camera(s) 118, 119, 162, 172 (e.g., volumetric point cloud imaging, three-dimensional (3D) imaging or depth map sensors, visible light camera and/or infrared camera), sonar (e.g., ranging sonar and/or imaging sonar), radar, LIDAR (Light Detection And Ranging, which can entail optical remote sensing that measures properties of scattered light to find range and/or other information of a distant target), LADAR (Laser Detection and Ranging), laser scanner, ultrasound sensor 538, etc. Sensor data obtained from the sensor system 500 may be communicated to the OCU 400 for use by the user. For example, the OCU 400 may process and display the sensor data in one or more graphical representations.

The proximity sensors 532 may be converging infrared (IR) emitter-sensor elements, sonar sensors, ultrasonic sensors, and/or imaging sensors (e.g., 3D depth map image sensors) that provide a signal to the controller 200 when an object is within a given range of the robot 100. The controller 200 (executing a control system) may execute behaviors that cause the robot 100 to take an action, such as changing its direction of travel, when an obstacle is detected.

The sensor system 500 may include a laser scanner 534 mounted on a forward portion of the robot body 110 and in communication with the controller 200. In the examples shown, the laser scanner 534 is mounted on the main body 110 facing forward (e.g., having a field of view along the forward drive direction F). The laser scanner 534 scans an area about the robot 100 and the controller 200, using signals received from the laser scanner 534, may create an environment map or object map of the scanned area. The controller 200 may use the object map for navigation, obstacle detection, and obstacle avoidance. Moreover, the controller 200 may use sensory inputs from other sensors of the sensor system 500 for creating object map and/or for navigation.

In some examples, the laser scanner 534 is a scanning LIDAR, which may use a laser that quickly scans an area in one dimension, as a "main" scan line, and a time-of-flight imaging element that uses a phase difference or similar technique to assign a depth to each pixel generated in the line (returning a two dimensional depth line in the plane of scanning). In order to generate a three dimensional map, the LIDAR can perform an "auxiliary" scan in a second direction (for example, by "nodding" the scanner). This mechanical scanning technique can be complemented, if not supplemented, by technologies such as the "Flash" LIDAR/LADAR and "Swiss Ranger" type focal plane imaging element sensors, techniques which use semiconductor stacks to permit time of flight calculations for a full 2-D matrix of pixels to provide a depth at each pixel, or even a series of depths at each pixel (with an encoded illuminator or illuminating laser).

The sensor system 500 may include one or more three-dimensional (3-D) image sensors in communication with the controller 200. In the example shown, any of the cameras 118, 119, 162, 172 can be more three-dimensional (3-D) image sensors. If the 3-D image sensor has a limited field of view, the controller 200 or the sensor system 500 can actuate the 3-D image sensor in a side-to-side scanning manner to create a relatively wider field of view to perform robust ODOA.

In some examples, the sensor system 500 includes an inertial measurement unit (IMU) 536 in communication with the controller 200 to measure and monitor a moment of inertia of the robot 100 with respect to the overall center of gravity $CG_R$ of the robot 100. The controller 200 may monitor any deviation in feedback from the IMU 536 from a threshold signal corresponding to normal unencumbered operation. For example, if the robot begins to pitch away from an upright position, it may be "clothes lined" or otherwise impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 100.

When accelerating from a stop, the controller 200 may take into account a moment of inertia of the robot 100 from its overall center of gravity $CG_R$ to prevent robot tipping. The controller 200 may use a model of its pose, including its current moment of inertia. When payloads are supported, the controller 200 may measure a load impact on the overall center of gravity $CG_R$ and monitor movement of the robot moment of inertia. If this is not possible, the controller 200 may apply a test torque command to the drive system 115 and measure actual linear and angular acceleration of the robot using the IMU 536, in order to experimentally determine safe limits.

Figure 11A:
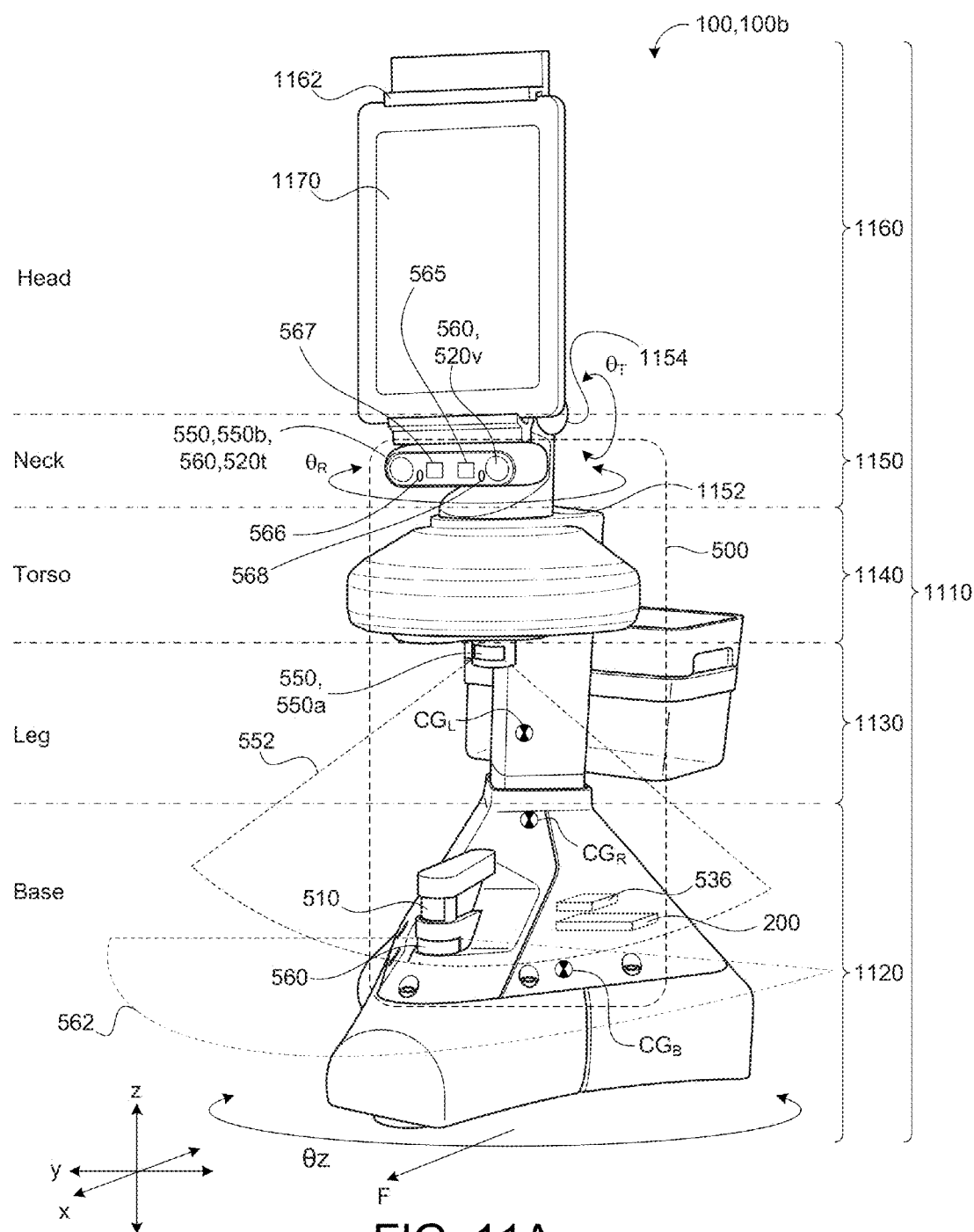
FIG. 11A is a perspective view of an exemplary mobile inspection robot.
Figure 11B:
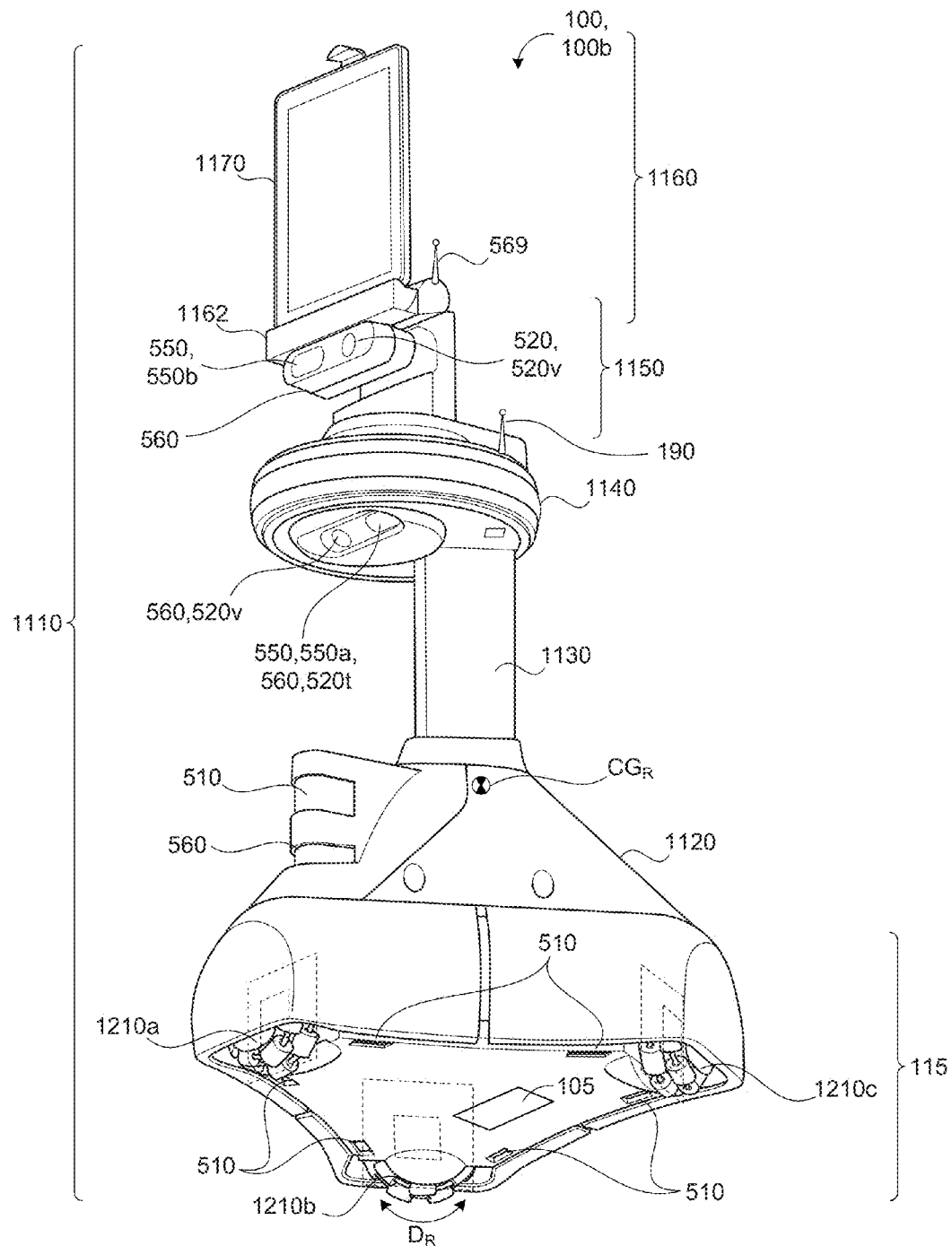
FIG. 11B is an elevated perspective view of an exemplary mobile inspection robot.

Referring to FIGS. 11A and 11B, in some implementations, a mobile robot 100, 100b includes a robot body 1110 (or chassis) that defines a forward drive direction F. The robot 100 also includes a drive system 115 and a sensor system 500, each supported by the robot body 1110 and in communication with a controller 200 that coordinates operation and movement of the robot 100b. A power source 105 (e.g., battery or batteries) can be carried by the robot body 1110 and in electrical communication with, and deliver power to, each of these components, as necessary.

In some implementations, the drive system 115 may provide onmi-directional and/or holonomic motion control of the robot 100. As used herein the term "omni-directional" refers to the ability to move in substantially any planar direction, i.e., side-to-side (lateral), forward/back, and rotational. These directions are generally referred to herein as x, y, and θz, respectively. Furthermore, the term "holonomic" is used in a manner substantially consistent with the literature use of the term and refers to the ability to move in a planar direction with three planar degrees of freedom, i.e., two translations and one rotation. Hence, a holonomic robot has the ability to move in a planar direction at a velocity made up of substantially any proportion of the three planar velocities (forward/back, lateral, and rotational), as well as the ability to change these proportions in a substantially continuous manner.

In some implementations, the drive system 115 includes first, second, and third driven drive wheels 1210a, 1210b, 210c equally spaced (e.g., trilaterally) about a vertical axis Z; however, other arrangements are possible as well, such as four drive wheels equally spaced about the Z axis. The drive wheels 1210a-d may define a transverse arcuate rolling surface (i.e., a curved profile in a direction transverse or perpendicular to the rolling direction $D_R$), which may aid maneuverability of the holonomic drive system 115.

The robot body 1110 may include a base 1120 supporting the drive system 115, at least one leg 1130 extending upwardly from the base 1120, and a torso 1140 supported by the at least one leg 1130. The leg 1130 may be extendible to alter a height of the torso 1140, which may support one or more sensors of the sensor system 500. The base 1120 may include enough weight (e.g., by supporting the power source 105 (batteries) to maintain a low center of gravity $CG_B$ of the base 1120 and a low overall center of gravity $CG_R$ of the robot 100b for maintaining mechanical stability. The robot body 1110 may also include a neck 1150 supported by the torso 1140. The neck 1150 supports a head 1160 by providing panning and tilting of the head 1160 with respect to the torso 1140. In the examples shown, the neck 1150 includes a rotator 1152 and a tilter 1154. The rotator 1152 may provide a range of angular movement OR (e.g., about the Z axis) of between about 90° and about 360°. Other ranges are possible as well.

The head 1160 may include a tablet dock 1162 for releasably receiving one or more computing tablets 1170, also referred to as a web pad or a tablet PC, each of which may have a touch screen. The computing tablet 1170 may execute instructions to display a graphical user interface for operating and/or interacting with the robot 100.

The robot 100b may be configured to carry payloads, such as bulky or power hungry payloads that may be inconvenient for a person doing thermal scanning, especially in an RF-denied environment. For example, the payload may include a recording apparatus for several channels of high quality video, temporarily or even to permanent media (like a CD burned), e.g., using a multi-TB hard drive), April code reader, etc.

To operate autonomously, the robot 100b may simultaneously localize and map its surroundings, using sensory inputs from the sensor system 500. Simultaneous localization and mapping (SLAM) is a technique the robot 100 may use to build up a map (e.g., an occupancy map) within an unknown environment or scene 10 (without a priori knowledge), or to update an map within a known environment (with a priori knowledge from a given map), while at the same time keeping track of its current location.

Maps can be used to determine a location within an environment 10 and to depict an environment for planning and navigation. The maps support the assessment of actual location by recording information obtained from a form of perception and comparing it to a current set of perceptions. The benefit of a map in aiding the assessment of a location increases as the precision and quality of the current perceptions decrease. Maps generally represent the state at the time that the map is provided or produced. This is not necessarily consistent with the state of the environment at the time the map is used. Other localization techniques include monocular visual SLAM (MonoSLAM) and implementations using an extended Kalman filter (EKF) for MonoSLAM solutions.

The robot 100 may localize in 21) (e.g., using rails), verify a location identity $L_n$ to that localization (e.g., to make sure the robot records data for targets of interest at that location), and move a camera in five degrees of freedom. For example, the robot may move a camera 162, 172, 520 with in an x, y, z envelope of between 1 ft.-6 ft. by 1 ft.-6 ft. by 8 ft. height range.

In some implementations, the robot 100b identifies and reads navigation references 80 (e.g., human and/or machine-readable glyphs or stickers) affixed near the electrical equipment 10 to be scanned (FIG. 1B). The robot 100b may receive and/or build a map of its environment for autonomous navigation. In some implementations, the robot 100 operates autonomously after being trained on the locations and heights of desired data collection targets $T_n$ (e.g., designated by navigation references 80) and/or programmed with a schedule of data collection.

The navigation references 80 may be a fiducial marker or fiducial, which is an object used in the field of view of an imaging sensor that appears in the produced image as a point of reference or a measure. The fiducial marker may be either something placed into or on the imaging subject, or a mark or set of marks in the reticle of an optical instrument. In some examples, the navigation reference 80 is a natural landmark (e.g., existing text, configurations and/or colors of a cabinet). In morphometrics, a landmark point is a point in a shape object in which correspondences between and within the populations of the object are preserved. Landmarks can be defined either manually or automatically by a computer program. There are three basic types of landmarks: anatomical landmarks, mathematical landmarks or pseudo-landmarks In some implementations, the navigation reference is a matrix barcode (or two-dimensional code), such as a quick response code (QR code). Additionally or alternatively, the navigation reference 80 is visual fiducial system, such as the APRIL tag from The APRIL Robotics Laboratory at the University of Michigan, that uses a 2D bar code style "tag", allowing full 6 DOF localization of features from a single image. Visual fiducials are artificial landmarks designed to be easy to recognize and distinguish from one another. Although related to other 2D barcode systems such as QR codes, they have significantly goals and applications. With a QR code, a human is typically involved in aligning the camera with the tag and photographs it at fairly high resolution obtaining hundreds of bytes, such as a web address. In contrast, a visual fiducial has a small information payload (perhaps 12 bits), but is designed to be automatically detected and localized even when it is at very low resolution, unevenly lit, oddly rotated, or tucked away in the corner of an otherwise cluttered image. Aiding their detection at long ranges, visual fiducials are comprised of many fewer data cells: the alignment markers of a QR tag comprise about 268 pixels (not including required headers or the payload), whereas the visual fiducials described in this paper range from about 49 to 100 pixels, including the payload. Visual fiducial systems provide camera-relative position and orientation of a tag.

To achieve reliable and robust autonomous movement, the sensor system 500 may include several different types of sensors which can be used in conjunction with one another to create a perception of the robot's environment sufficient to allow the robot 100 to make intelligent decisions about actions to take in that environment. The sensor system 500 may include one or more types of sensors supported by the robot body 1110, which may include obstacle detection obstacle avoidance (ODOA) sensors, communication sensors, navigation sensors, etc. For example, these sensors may include, but not limited to, proximity sensors, contact sensors, three-dimensional (3D) imaging/depth map sensors, a camera (e.g., visible light, infrared camera and/or stereo camera), sonar, radar, LIDAR (Light Detection And Ranging, which can entail optical remote sensing that measures properties of scattered light to find range and/or other information of a distant target), LADAR (Laser Detection and Ranging), etc.

The sensor system 500 may include an inertial measurement unit (IMU) 536 in communication with the controller 200 to measure and monitor a moment of inertia of the robot 100 with respect to the overall center of gravity $CG_R$ of the robot 100. The controller 200 may monitor any deviation in feedback from the IMU 536 from a threshold signal corresponding to normal unencumbered operation.

In some implementations, the sensor system 500 includes an array of proximity sensors 510, one or more cameras 520 (e.g., stereo cameras, visible light camera, infrared camera, thermography, etc.), and/or one or more 3-D imaging sensors 550 (e.g., volumetric point cloud imaging device) in communication with the controller 200 and arranged in one or more zones or portions of the robot 100b for detecting any nearby or intruding obstacles. The proximity sensors 510 may be converging infrared (IR) emitter-sensor elements, sonar sensors, and/or ultrasonic sensors that provide a signal to the controller 200 when an object is within a given range of the robot 100. If any of the sensors 510, 520, 550 has a limited field of view, the controller 200 or the sensor system 500 can actuate the sensor 510, 520, 550 in a side-to-side scanning manner to create a relatively wider field of view to perform robust ODOA.

The 3-D image sensors 550 may be capable of producing the following types of data: (i) a depth map or point cloud, (ii) a reflectivity based intensity image, and/or (iii) a regular intensity image. The 3-D image sensors 550 may obtain such data by image pattern matching, measuring the flight time and/or phase delay shift for light emitted from a source and reflected off of a target.

In some implementations, reasoning or control software, executable on a processor (e.g., of the robot controller 200), uses a combination of algorithms executed using various data types generated by the sensor system 500. The reasoning software processes the data collected from the sensor system 500 and outputs data for making navigational decisions on where the robot 100 can move without colliding with an obstacle, for example. By accumulating imaging data over time of the robot's surroundings, the reasoning software can in turn apply effective methods to selected segments of the sensed image(s) to improve simultaneous localization and mapping (SLAM).

The reliability of executing robot collision free moves may be based on: (i) a confidence level built by high level reasoning over time and (ii) a depth-perceptive sensor that accumulates three major types of data for analysis—(a) a depth image, (b) an active illumination image and (c) an ambient illumination image. Algorithms cognizant of the different types of data can be executed on each of the images obtained by the depth-perceptive imaging sensor 550. The aggregate data may improve the confidence level as compared to a system using only one of the kinds of data.

The 3-D image sensors 550 may obtain images containing depth and brightness data from a scene about the robot 100 (e.g., a sensor view portion of a room or work area) that contains one or more objects. The controller 200 may be configured to determine occupancy data for the object based on the captured reflected light from the scene. Moreover, the controller 200, in some examples, issues a drive command to the drive system 115 based at least in part on the occupancy data to circumnavigate obstacles (i.e., the object in the scene). The 3-D image sensors 550 may repeatedly capture scene depth images for real-time decision making by the controller 200 to navigate the robot 100 about the scene without colliding into any objects in the scene. For example, the speed or frequency in which the depth image data is obtained by the 3-D image sensors 550 may be controlled by a shutter speed of the 3-D image sensors 550. In addition, the controller 200 may receive an event trigger (e.g., from another sensor component of the sensor system 500, such as proximity sensor 510, notifying the controller 200 of a nearby object or hazard. The controller 200, in response to the event trigger, can cause the 3-D image sensors 550 to increase a frequency at which depth images are captured and occupancy information is obtained.

In some implementations, the robot 100 includes a first and second imaging sensors 550a, 550b (e.g., 3D depth imaging sensors) disposed on the torso 1140. Both imaging sensors 550a, 550b are arranged to have a field of view 552 along the forward drive direction F. The first imaging sensor 550a is arranged to aim substantially downward and away from the robot 100 (e.g., to view an area on the ground and/or about a lower portion of the robot) to detect objects before contact with the base 1120 or leg 1130. By angling the first imaging sensor 550a downward, the robot 100 receives dense sensor coverage in an area immediately forward or adjacent to the robot 100, which is relevant for short-term travel of the robot 100 in the forward direction. The second imaging sensor 550b is arranged pointing substantially parallel with the ground along the forward drive direction F (e.g., to detect objects approaching a mid and/or upper portion of the robot 100). In other examples, the second imaging sensor 550b is arranged pointing above the ground or even upward away from the ground.

In some implementations, the base 1120, the torso 1140 and/or the head 1160 support one or more scanner payloads 560 for obtain sensor readings of the electrical equipment 10. The scanner payload 560 may include a visual camera 520v, a thermography camera 520t, a temperature sensor 566, a humidity sensor 568, and/or other environmental monitoring sensors. The robot 100b may adjust a height of the torso 1140 (via the leg 1130), articulate the head 1160, and/or move using the drive system 115 to point a field of view 562 of the scanner payload 560 onto a location of interest. For example, referring again to FIG. 1B, the robot 100b may move the field of view 562 of the scanner payload 560 along a path 564 (e.g., back and forth, zig-zag, etc.) to check one or more points of interest on the electrical equipment 10. The scanner payload 560 may include a computing processor 565 and removable data storage 567 for storing imagery and associated data.

The robot 100a shown in FIGS. 2-5 may support the scanner payload 560 on an arm 150 or in the head 160. As a result, the robot 100a can move the scanner payload 560 to different locations relative to the chassis 110. The robot 100 may move the scanner payload 560 to obtain environmental scans (e.g., thermal, humidity, electrical, etc.) of one or more portions of the electrical equipment 10. In some implementations, the robot 100 supports the scanner payload 560 so that it can be positioned with four or five degrees of freedom (DOF). For example, if the robot 100 has an arm 150, the robot 100 may reach the scanner payload 560 up to a specific height for positioning adjacent a scanning target.

Additionally or alternatively, the robot 100 may pan, tilt, rotate, and/or lift the scanner payload 560 to a desired position. Other arrangements are possible as well.

Figure 11C:
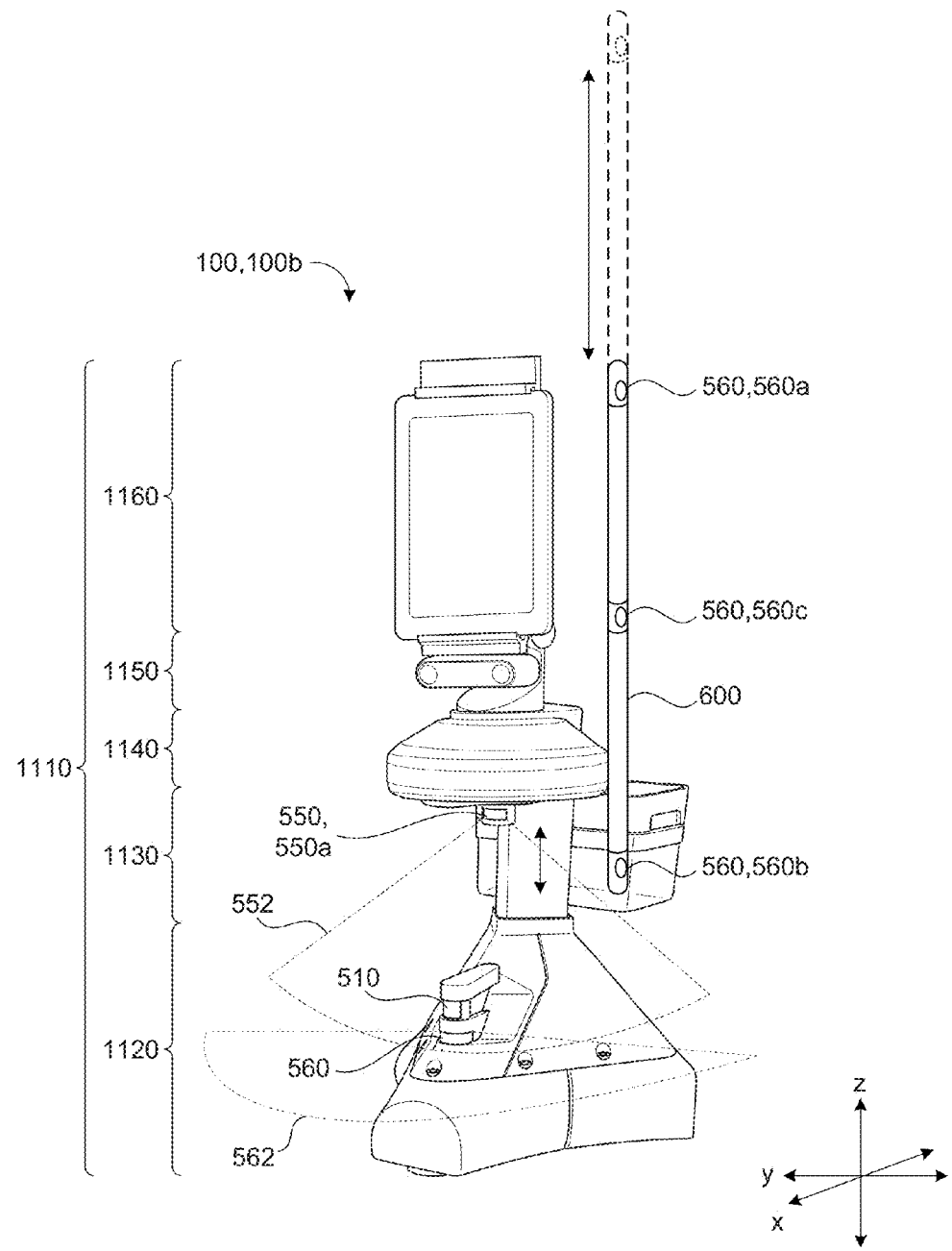
FIG. 11C is a perspective view of an exemplary mobile inspection robot with a mast.

Referring to FIG. 11C, in some implementations, the robot 100b includes a mast 600, which may be extendible (e.g., having at least 12 inches of travel). The mast 600 may be attached to any portion of the body 1100, such as the base 1120, the leg 1130, the torso 1140 or the head 1160. The mast 600 may extend telescopically or as two or more sliding portions. The mast 600 is shown vertical (i.e., extending in the z direction); however, other arrangements are possible as well, such a mast 600 extending at an angle relative to the z-direction. The controller 200 may cause the mast 600 to move to a deployed position during a data collection mode (e.g., for obtaining sensor measurements) and a stowed position during a rapid travel mode (e.g., when moving greater than 1 m/s). The mast 600 may be arranged to stay within a footprint of the robot 100 on the work surface, e.g., to avoid accidental snagging or collisions with objects.

The mast 600 may have one or more scanner payloads 560 disposed along the length of the mast 600. The scanner payload 560 may include one or more sensors for monitoring or evaluating the environmental conditions about the payload 560. In a scanner payload 560 that includes that includes a camera 520, the camera 520 may have pan/tilt capabilities to obtain relatively larger field of view and obtain imagery of targets at variable heights above the floor (e.g., 0.5 to 8.5 feet). Moreover, the scanner payload 560 may measure air temperature, relative humidity and air flow at various heights above the floor (e.g., 0.5, 2.5, 4.5, 6.5 and/or 8.5 feet). In some examples, the scanner payload 560 includes sensors for monitoring air quality, such as carbon monoxide, radon, mold, asbestos, and other particulates, gases, etc.

In some examples, the mast 600 has a first scanner payload 560a disposed near a distal end 602 of the mast 600, a second scanner payload 560b disposed near a proximal end 604 of the mast 600, and a third scanner payload 560c disposed approximately midway between the distal and proximal ends 602, 604 of the mast 600. Other arrangements are possible as well. For example, several scanner payloads 560 may be arranged evenly or unevenly spaced along the length of the mast 600. In implementations where the mast 600 is extendible, the mast 600 may include only one scanner payload 560 near the distal end 602 of the mast 600; or the first scanner payload 560a disposed near the distal end 602 of the mast 600 and the second scanner payload 560b disposed near the proximal end 604 of the mast 600.

Figure 13:
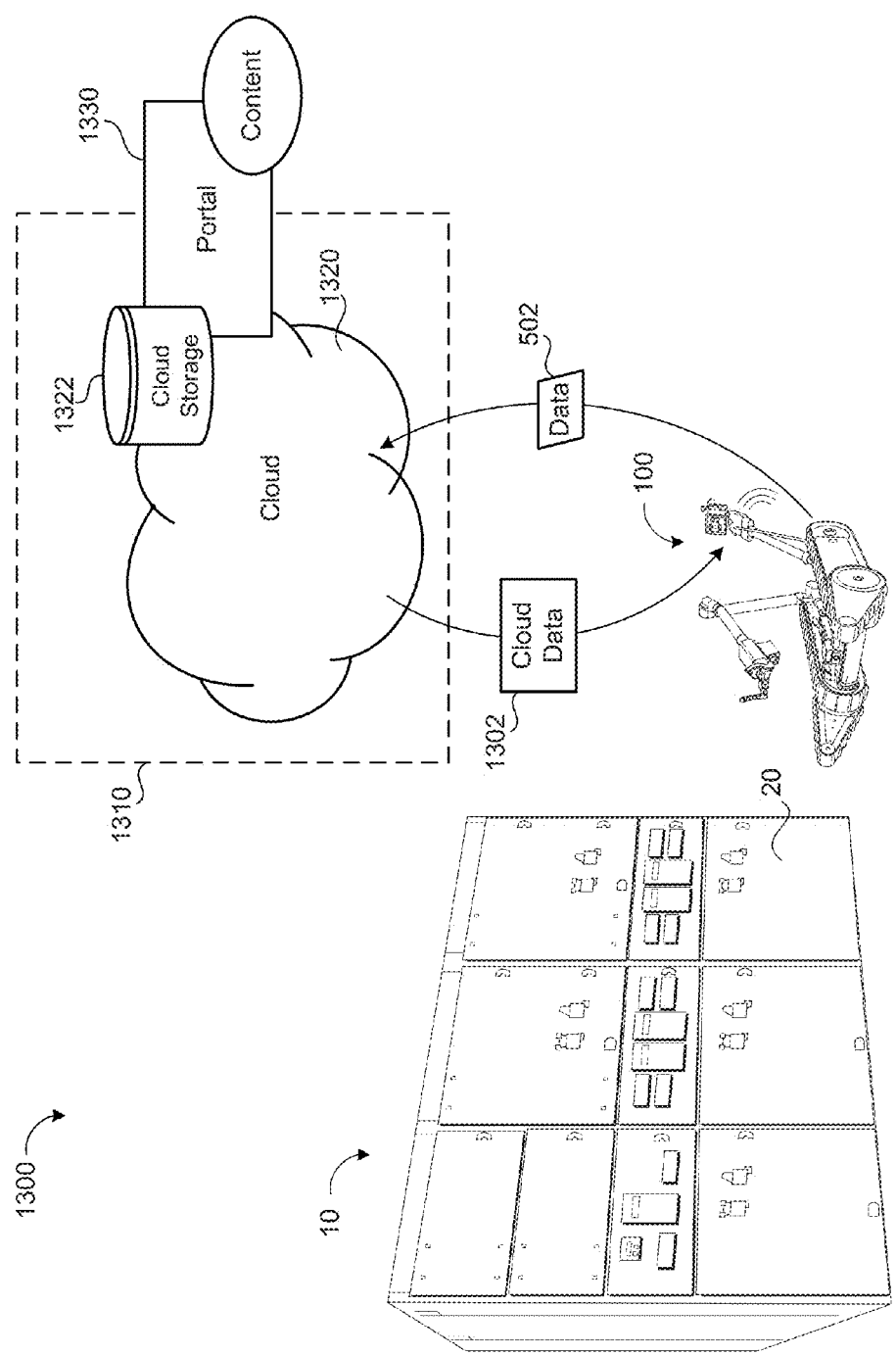
FIG. 13 is a schematic view of an exemplary robot communicating with a remote computing device.

The robot 100b may autonomously collect environmental data at selectable spacing, horizontally (x, y directions) and/or vertically (z direction) throughout a room without any human intervention. For example, the robot 100 may autonomously inspect electrical equipment (switches, PDUs, RPPs, servers, etc.) at specific points (x, y, z locations). After collecting sensor data, the robot 100b may locally store and process the data, such as on the removable data storage 567 and the computing processor 565, respectively. Alternatively or additionally, the robot 100b may offload the data to remote storage and/or processing device, such as a cloud 1320, a data receiving station 94, and/or a facility manager 70 (FIGS. 1D and 13). The robot 100 provides repeatable and consistent data collection.

Figure 12:
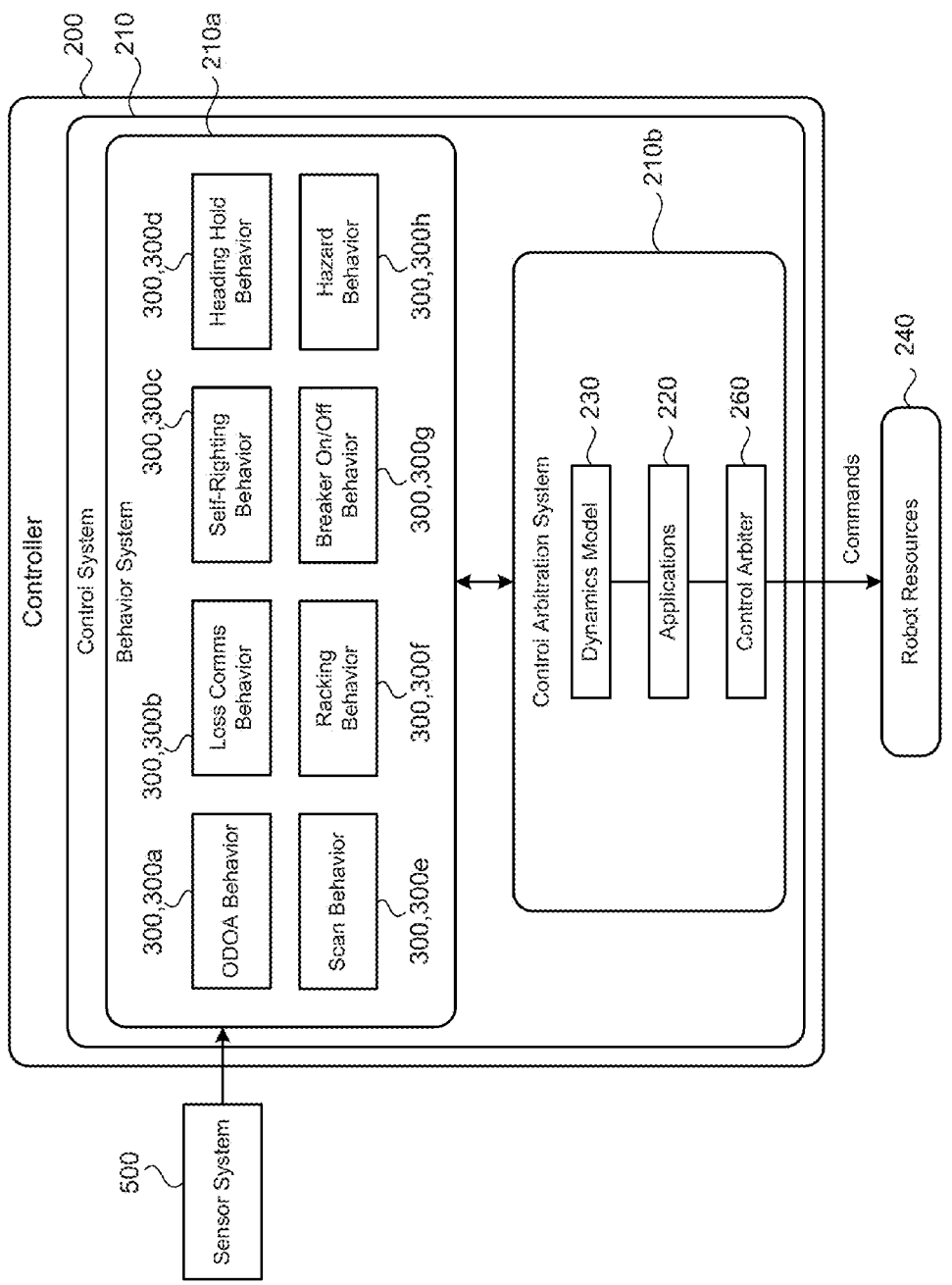
FIG. 12 is a schematic view of an exemplary robot control system.

Referring to FIG. 12, in some implementations, the controller 200 (e.g., a device having one or more computing processors in communication with memory capable of storing instructions executable on the computing processor(s)) executes a control system 210, which includes a behavior system 210a and a control arbitration system 210b in communication with each other. The control arbitration system 210b allows robot applications 220 to be dynamically added and removed from the control system 210, and facilitates allowing applications 220 to each control the robot 100 without needing to know about any other applications 220. In other words, the control arbitration system 210b provides a simple prioritized control mechanism between applications 220 and resources 240 of the robot 100.

The applications 220 can be stored in memory of or communicated to the robot 100, to run concurrently on (e.g., on a processor) and simultaneously control the robot 100. The applications 220 may access behaviors 300 of the behavior system 210a. The independently deployed applications 220 are combined dynamically at runtime and to share robot resources 240 (e.g., drive system 115, arm(s) 150, head(s) 160 and/or gripper(s) 170) of the robot 100. A low-level policy is implemented for dynamically sharing the robot resources 240 among the applications 220 at run-time. The policy determines which application 220 has control of the robot resources 240 as required by that application 220 (e.g. a priority hierarchy among the applications 220). Applications 220 can start and stop dynamically and run completely independently of each other. The control system 210 also allows for complex behaviors 300 which can be combined together to assist each other.

The control arbitration system 2100b includes one or more application(s) 220 in communication with a control arbiter 260. The control arbitration system 210b may include components that provide an interface to the control arbitration system 210b for the applications 220. Such components may abstract and encapsulate away the complexities of authentication, distributed resource control arbiters, command buffering, coordinate the prioritization of the applications 220 and the like. The control arbiter 260 receives commands from every application 220 generates a single command based on the applications' priorities and publishes it for its associated resources 240. The control arbiter 260 receives state feedback from its associated resources 240 and may send it back up to the applications 220. The robot resources 240 may be a network of functional modules (e.g., actuators, drive systems, and groups thereof) with one or more hardware controllers. The commands of the control arbiter 260 are specific to the resource 240 to carry out specific actions.

A dynamics model 230 executable on the controller 200 is configured to compute the center for gravity (CG), moments of inertia, and cross products of inertial of various portions of the robot 100 for the assessing a current robot state. With reference to the exemplary robot 100a shown in FIGS. 2-5, the dynamics model 230 may be configured to calculate the center of gravity $CG_M$ of the main body 110, the center of gravity $CG_F$ of each flipper 130, the center of gravity $CG_A$ of each arm 150, the center of gravity $CG_H$ of each head 160, and/or the center of gravity $CG_R$ of the entire robot 100a. With reference to the exemplary robot 100b shown in FIGS. 11A and 11B, the dynamics model 230 may be configured to calculate the center of gravity $CG_B$ of the base 1120, the center of gravity $CG_L$ of the Leg 1130, and/or the center of gravity $CG_R$ of the entire robot 100b. The dynamics model 230 may also model the shapes, weight, and/or moments of inertia of these components. In some examples, the dynamics model 230 communicates with the inertial moment unit (IMU) 536 or portions of one (e.g., accelerometers and/or gyros) in communication with the controller 200 for calculating the various centers of gravity of the robot 100. The dynamics model 230 can be used by the controller 200, along with other programs 220 or behaviors 300 to determine operating envelopes of the robot 100 and its components.

In some implementations, a behavior 300 is a plug-in component that provides a hierarchical, state-full evaluation function that couples sensory feedback from multiple sources, such as the sensor system 500, with a-priori limits and information into evaluation feedback on the allowable actions of the robot 100. Since the behaviors 300 are pluggable into the application 220 (e.g. residing inside or outside of the application 220), they can be removed and added without having to modify the application 220 or any other part of the control system 210. Each behavior 300 is a standalone policy. To make behaviors 300 more powerful, it is possible to attach the output of multiple behaviors 300 together into the input of another so that you can have complex combination functions. The behaviors 300 are intended to implement manageable portions of the total cognizance of the robot 100.

In the example shown, the behavior system 210a includes an obstacle detection/obstacle avoidance (ODOA) behavior 300a for determining responsive robot actions based on obstacles perceived by the sensor (e.g., turn away; turn around; stop before the obstacle, etc.). Another behavior 300 may include a loss communications behavior 300b for determining a driven path of the robot 100 during a loss of communication with a satellite for obtaining global positioning coordinates. The driven path can be determined using at least one of the inertial measurement unit 536, odometry, and dead reckoning. For the exemplary robot 100a shown in FIGS. 2-5, a self-right behavior 300c can provide actions for self-righting the robot 100 upon detecting a roll-over. Possible actions include rotating the flippers 130 a continuous 360 degrees to cause the main body to flip 180 degrees. For either robot 100a, 100b shown, a heading hold behavior 300d provides an assistant behavior that allows the robot 100 correct a heading of the driven robot 100. For example, if the robot 100 hits a rock, obstacle, or course variation while driving in veers off course, the heading hold behavior 300d can automatically correct the heading of the robot 100, allowing the robot 100 to maintain a drive direction issued by the user. The behavior system 210a may include one or more inspection behaviors. The inspection behavior(s) may influence execution of commands by the control arbitration system 210ab based on sensor signals received from the sensor system 500 to identify and inspect electrical equipment, for example, or other hazardous items.

In some implementations, a scan behavior 300e may be executed to have the robot 100 identify electrical equipment 10 (e.g., switchgear 10a or data center equipment 10b), one or more circuit breakers 20, or other electrical equipment or hazards in the local perceptual space of the robot 100 (e.g., using image recognition from images or video captured by a robot camera, a layout map provided to the robot 100 and/or a robot map determined by the robot controller 200 using sensory inputs from the sensor system 500). In some implementations, the scan behavior 300e causes the robot 100 to identify a navigation reference 80 (e.g., visual fiducial) using the sensor system 500 and maneuver relative to the navigation reference 80. The scan behavior 300e may cause the robot 100 to identify the electrical equipment 10 using the navigation reference 80 and execute environmental scans on the identified electrical equipment 10.

Using the sensor system 500, the robot 100 may move the scanner payload 560 to execute sensor readings or capture imagery of a point of interest. In the exemplary robot 100a shown in FIGS. 2-5, the scanner payload 560 may be mounted to an extensible mast, such as an arm 150, which can be positioned at different heights above the floor. In the exemplary robot 100b shown in FIGS. 11A and 11B, the scanner payload 560 may be mounted to the head 1160, which can be moved in elevation, pan, and tilt. For example, with a robot 100a having an articulated arm 150, the robot 100a may move the arm 150 to position a supported sensor head 160 (having the scanner payload 560) to face the electrical equipment 10 (e.g., circuit breaker 20) and obtained a sensory scan of the electrical equipment 10, such as an infrared image/thermal scan, temperature, humidity, and/or ultrasound measurement of the electrical equipment 10. The robot controller 200 can analyze the captured sensor data and/or transmit the received sensor data to a remote location. For example, the controller 200 may analyze the infrared image and communicate a probability of arc flashing or another hazardous condition.

The robot 100 may execute the scan behavior 300e in an autonomous operation mode or a semi-autonomous mode, with the scan behavior 300e assisting the operator and executing a sensory scan of the item of interest, such as a thermal scan of a circuit breaker 20. For example, the scan behavior 300e may assist the operator by identifying a circuit breaker 20, automatically moving a camera 118, 119, 162, 172 into place for capturing the infrared image/thermal scan and/or ultrasound measurement, and/or analyzing the captured infrared image and/or ultrasound measurement. Additionally or alternatively, the robot 100 may be used to detect other hazardous situations. Using the sensor system 500, the robot 100 may detect chemical hazards, radioactive hazards, physical hazards, molten metal, etc.

Referring also to FIGS. 1B and 1C, in some implementations, the scan behavior 300e causes the robot 100, 100b to leave a docking station 90, execute a calibration scan of a thermal emissivity calibration target 82 and store the results, and then proceed to a scan location $L_n$. The robot 100 may autonomously navigate to a first scan location $L_1$, locate its position precisely relative to the electrical equipment 10 using SLAM and/or the navigation references 80, and position the scanner payload 560 (e.g., in elevation, pan, and tilt) to aim its field of view 562 at the first scan target $T_1$. The robot 100 may acquire the sensor data, such as thermal and visual imagery of the target $T_1$ and store sensor/imaging data on the payload memory 567 (e.g., removable media). In some examples, the robot 100 stores image data and associated ancillary data, such as date and time, robot location, navigation reference stickers imaged, payload elevation, pointing angles, etc. The robot 100 may reposition the scanner payload 560 (in elevation, pan, and tilt) until all targets $T_n$ at that scan location $L_n$ are imaged, reposition itself to a next scan location $L_{n+1}$ and repeats the process.

Once the robot 100 has completed all the scan locations $L_n$, it may return to a starting location $L_1$ and wait for a next command or return to the docking station 90. While waiting, the scan results for current and prior scans may be available via the computing tablet 1170 for immediate review. When all scans are complete in a given mission, the removable storage media 567 containing the thermal scan results and associated data can be removed from the robot and sent for archive or off-line analysis.

The scanner payload 560 may include a short range data transmitter-receiver 569 (FIG. 11B), such as an infrared data link, for communications with a data receiving station 94, which may be part of or near the docking station 90. The data receiving station 94 may include a short range data transmitter-receiver 92 (e.g., radio frequency (RF) or infrared data link) (FIG. 1C) for communications with the scanner payload 560, and a hard-wired data connection to a central environmental monitoring system, such as the facility manager 70.

The docking station 90 may include a docking port for the robot 100 and a connection for a 120 VAC wall power receptacle. The docking station 90 may be positioned such that the robot 100b can communicate with the data receiving station while docked.

In some implementations, at a scheduled scan time, the robot 100 autonomously maneuvers from the docketing station to a first data collection location $L_1$. The robot 100 may navigate to the first data collection location $L_1$ by identifying one or more navigation references 80 (e.g., floor level navigation references, cabinet navigation references, etc.) and maneuver relative to the identified navigation reference(s) 80. The robot 100 positions the scanner payload 560 adjacent a first target $T_1$ (e.g., at a first defined height or x, y, z location) and collects data for a specified dwell time. The robot 100 autonomously repeats this process for each additional target $T_n$ at that location $L_1$. The robot 100 may associate the collected data with each respective target $T_n$ and/or each location $L_n$. For example, at an electronics cabinet, the robot 100 may associate and store (e.g., locally or remotely) collected data with that cabinet (location $L_n$) and/or portions of that cabinet (targets $T_n$). The robot 100 may autonomously move to the next monitoring location $L_n$ and collect data at each target $T_n$ for a corresponding dwell time. The robot 100 may repeat that process until all monitoring locations $L_n$ and targets $T_n$ are scanned. The robot 100 may autonomously return to the docking station 90 and establish communications with the data receiving station 94. When communications are established, the data collection payload may transmit the collected data to the central environmental monitoring system. While waiting for the next scheduled scan time, the robot 100 may recharge its power source 105.

Referring again to FIG. 12, a racking behavior 300f may cause the robot 100a to locate and move proximate to a particular circuit breaker 20 (e.g., designated by the operator 30 on the OCU 400). The racking behavior 300f may locate the lead screw 25 of the circuit breaker 20, position the gripper 170 or racking actuator 180 to engage the lead screw 25, and turn the lead screw 25 (CW or CCW) to move the circuit breaker 20 between its racked and unracked positions. In some implementations, the racking behavior 300f assists the operator 30 in one or more of those actions.

In some implementations, a breaker on/off behavior 300g may cause the robot 100 to locate and move proximate to a particular circuit breaker 20 (e.g., designated by the operator 30 on the OCU 400), locate a lever arm 24 or button 26 of the circuit breaker 20, position the gripper 170 to engage and actuate the lever arm 24 or button 26. The behavior 300g may cause the robot 100 to execute a smooth coordinated action having the gripper 170 grasp and rotate the lever arm 24 or toggle the button 26. In some examples, the breaker on/off behavior 300g assists the operator 30 with one or more of those actions (e.g., in a semi-autonomous mode). Other behaviors are possible as well, such as a hazard detection behavior 300h, which uses the sensor system 500 to detect a hazardous situation (e.g., electrical, chemical, physical, environmental, and/or weather hazard).

FIG. 13 provides a schematic view of exemplary robot system architecture 1300 having the robot 100 communicating with a remote computing facility 1310, such as or including a cloud computing service 1320 (also referred to as the cloud). The robot 100 may include an antenna 190 in communication with the controller 200 or the controller 200 may include a wireless transceiver for communicating with the cloud 1320 (e.g., WiFi, radio frequency (RF), etc.).

The cloud 1320 provides cloud computing and/or cloud storage capabilities. Cloud computing may provide Internet-based computing, whereby shared servers provide resources, software, and data to computers and other devices on demand. For example, the cloud 1320 may be a cloud computing service that includes at least one server computing device, which may include a service abstraction layer and a hypertext transfer protocol wrapper over a server virtual machine instantiated thereon. The server computing device may be configured to parse HTTP requests and send HTTP responses. Cloud computing may be a technology that uses the Internet and central remote servers to maintain data and applications. Cloud computing can allow users to access and use applications without installation and access personal files at any computer with internet access. Cloud computing allows for relatively more efficient computing by centralizing storage, memory, processing and bandwidth. The cloud 1320 can provide scalable, on-demand computing power, storage, and bandwidth, while reducing robot hardware requirements (e.g., by freeing up CPU and memory usage). Robot connectivity to the cloud 1320 allows automatic data gathering of robot operation and usage histories without requiring the robot 100 to return to a base station. Moreover, continuous data collection over time can yields a wealth of data that can be mined for marketing, product development, and support.

Cloud storage 1322 can be a model of networked computer data storage where data is stored on multiple virtual servers, generally hosted by third parties. By providing communication between the robot 100 and the cloud 1320, information gathered by the robot 100 can be securely viewed by authorized users via a web based information portal 1330. The portal 1330 may be used for gathering and/or providing information, such as user information, facility status information, and robot status information. Information can be integrated with third-party information to provide additional functionality and resources to the user and/or the robot 100. The robot system architecture 1300 can facilitate proactive data collection. For example, data 502 collected using the sensor system 500 of the robot 100 can be communicated to the cloud 1320 (e.g., wireless communication, such as WiFi, radio frequency (RF), etc.) for collection, storage, and/or analysis. Moreover, a facility operator in remote location may access the received sensor data 502 for review or analysis. The cloud service 1320 may execute an application outputting data 1302 that may be communicated to the robot 100. For example, the cloud service 1320 may process received image data 502 (e.g., a dense image sequence or annotated dense image sequence captured by a robot camera 118, 119, 162, 172) and return a processed data set 1302 (e.g., a layout map of the environment) to the robot 100, e.g., to the controller 200. The controller 200 may issue drive commands to the drive system 115 based on the received processed data set 1302 for maneuvering about an area.

Figure 14:
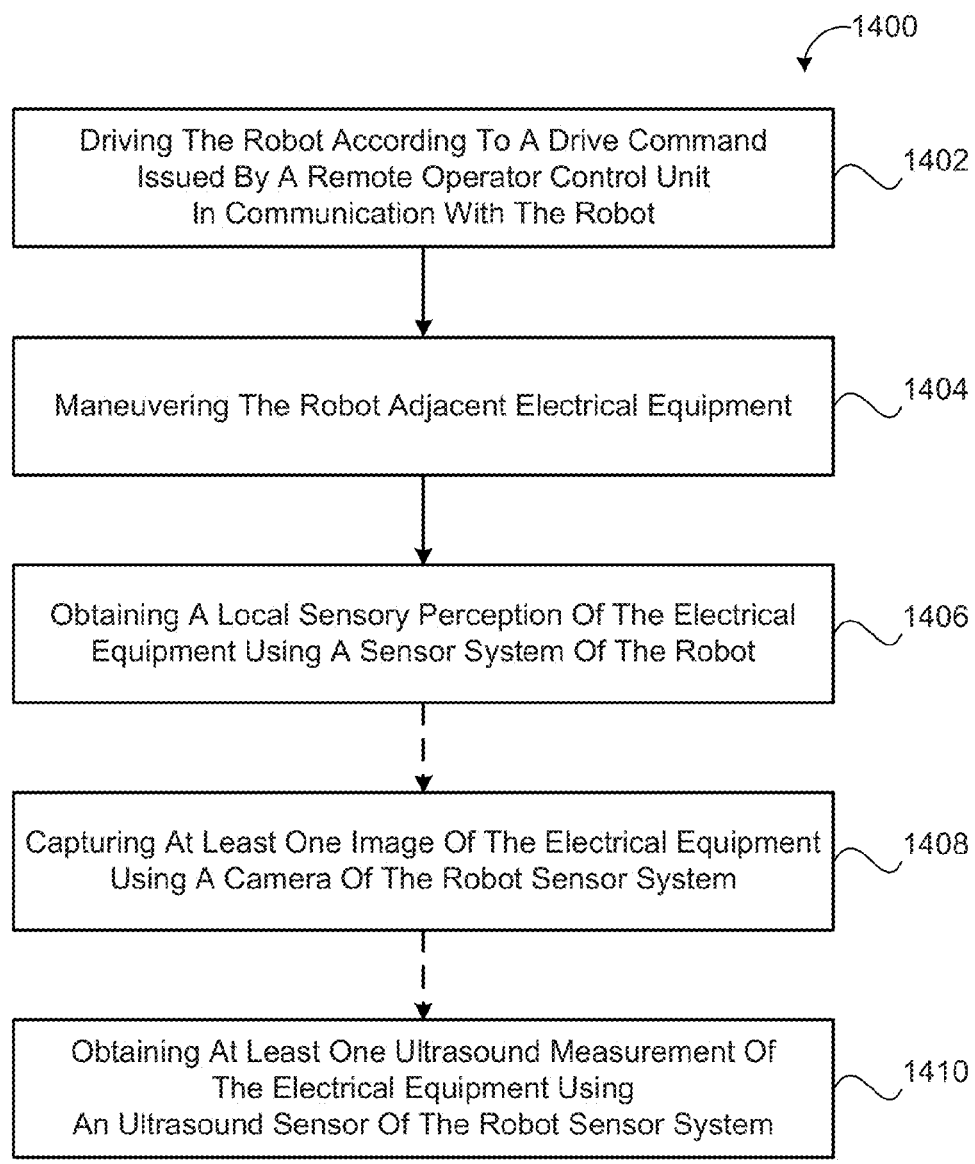
FIG. 14 provides an exemplary arrangement of operations for a method of operating a mobile robot.

FIG. 14 provides an exemplary arrangement 1400 of operations for a method of operating a mobile robot 100. The method includes driving 1402 the robot according to a drive command issued by a remote operator control unit 400 in communication with the robot 100, maneuvering 1404 the robot 100 adjacent electrical equipment 10 (e.g., switchgear), and obtaining 1406 a local sensory perception of the electrical equipment 10 using a sensor system 500 of the robot 100. The method may include capturing 1408 at least one image, such as an infrared image of the electrical equipment 10 using a camera of the robot sensor system and/or obtaining 1410 at least one ultrasound measurement of the electrical equipment 10 using an ultrasound sensor 538 of the robot sensor system 500. The method may include obtain other sensor readings as wells, such as temperature, humidity, and/or other environmental parameters.

In some implementations, the method includes identifying a switchgear panel 22 in the local sensory perception and opening or closing the switchgear panel 22 using an articulated manipulator arm 150 disposed on the robot 100. Additionally or alternatively, the method may include identifying a circuit breaker 20 in the local sensory perception, engaging the identified circuit breaker 20 with a racking actuator 180 of the robot 100, and moving the circuit break 20 between a racked position and unracked position using the racking actuator 180. The method may include identifying an actuator 24, 26 (e.g., lever arm or button) of a circuit breaker 20 in the local sensory perception and actuating the circuit breaker actuator 24, 26 using an articulated manipulator arm 150 disposed on the robot 100. For example, for a lever arm 24 as the circuit breaker actuator, the method may include commanding (e.g., via the operator control unit 400) movement of the manipulator arm 150 and a gripper 170 disposed on the manipulator arm 150 to grasp and rotate the lever arm 24 between open and closed positions. For a button 26 as the circuit breaker actuator, the method may include commanding movement of the manipulator arm 150 to toggle the button 26.

In some implementations, the method includes communicating sensor data 502 of the sensor system 500 to a remote computing device 1210, such as a cloud computing service 1220. As the robot 100 collects sensor data 502 from the sensor system 500, the controller 200 may communicate the sensor data 502 upon receipt from the sensor system 500 and/or in batches. Moreover, the controller 200 may process the sensor data 502 (e.g., execute one or more filters or algorithms, such as a Kalman filter) before communicating the sensor data 502 to the cloud service 1220 or other remote computing device.

Referring to FIGS. 15A-15E, in some implementations, a monitoring application 1500 executing on the robot 100 (e.g., on the web pad 1170, the controller 200, or the payload processor 565) and/or a remote computer 1502 electronically displays one or more monitoring views 1510 on a local display, such as the web pad 1170 or a remote computer display 1504. Moreover, a remote user may access the monitoring view(s) 1510 through the portal 1330 hosted by the cloud 1320 (FIG. 13).

Figure 15A:
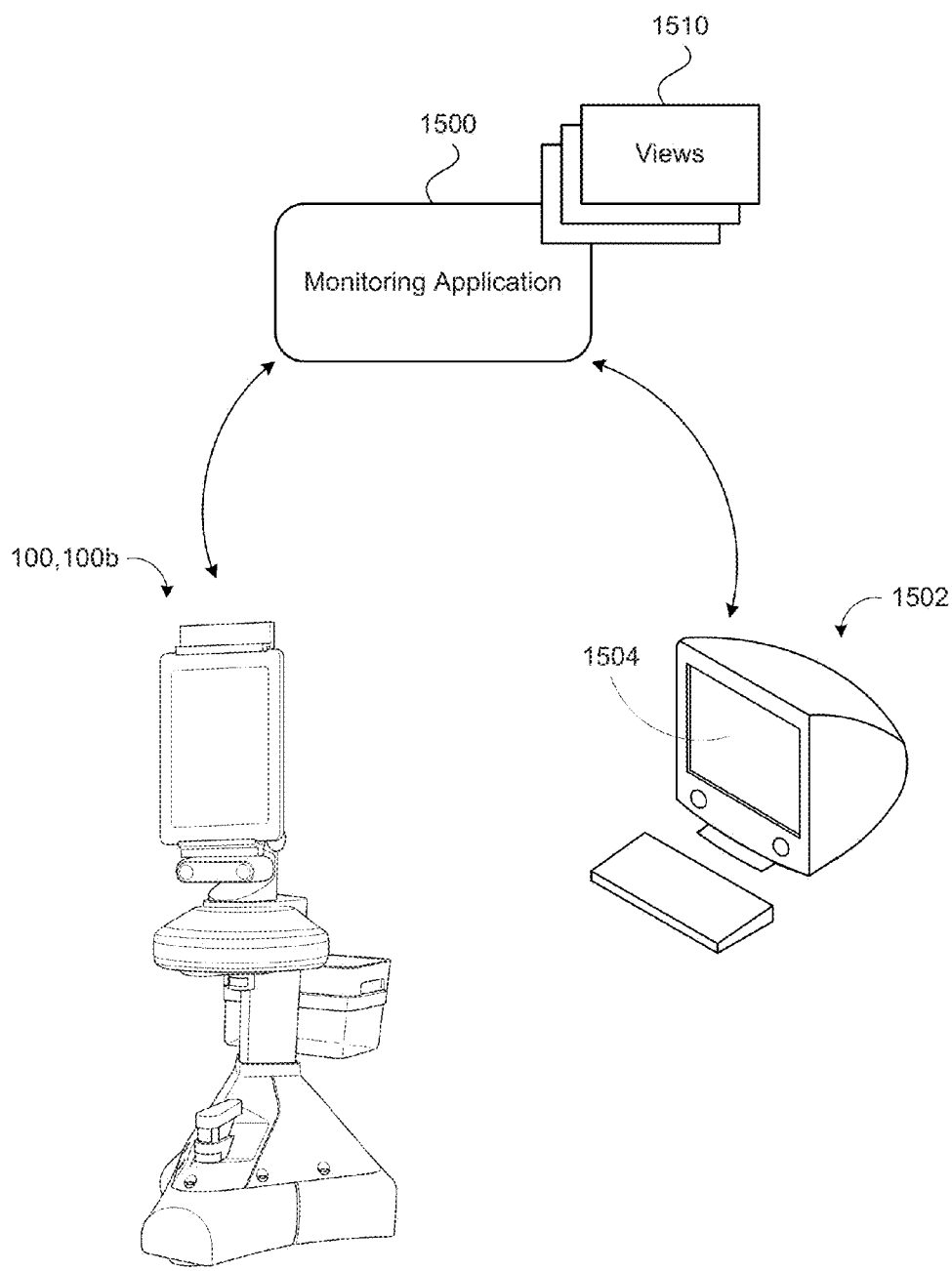
FIG. 15A is a schematic view of an exemplary environmental monitoring system.
Figure 15B:
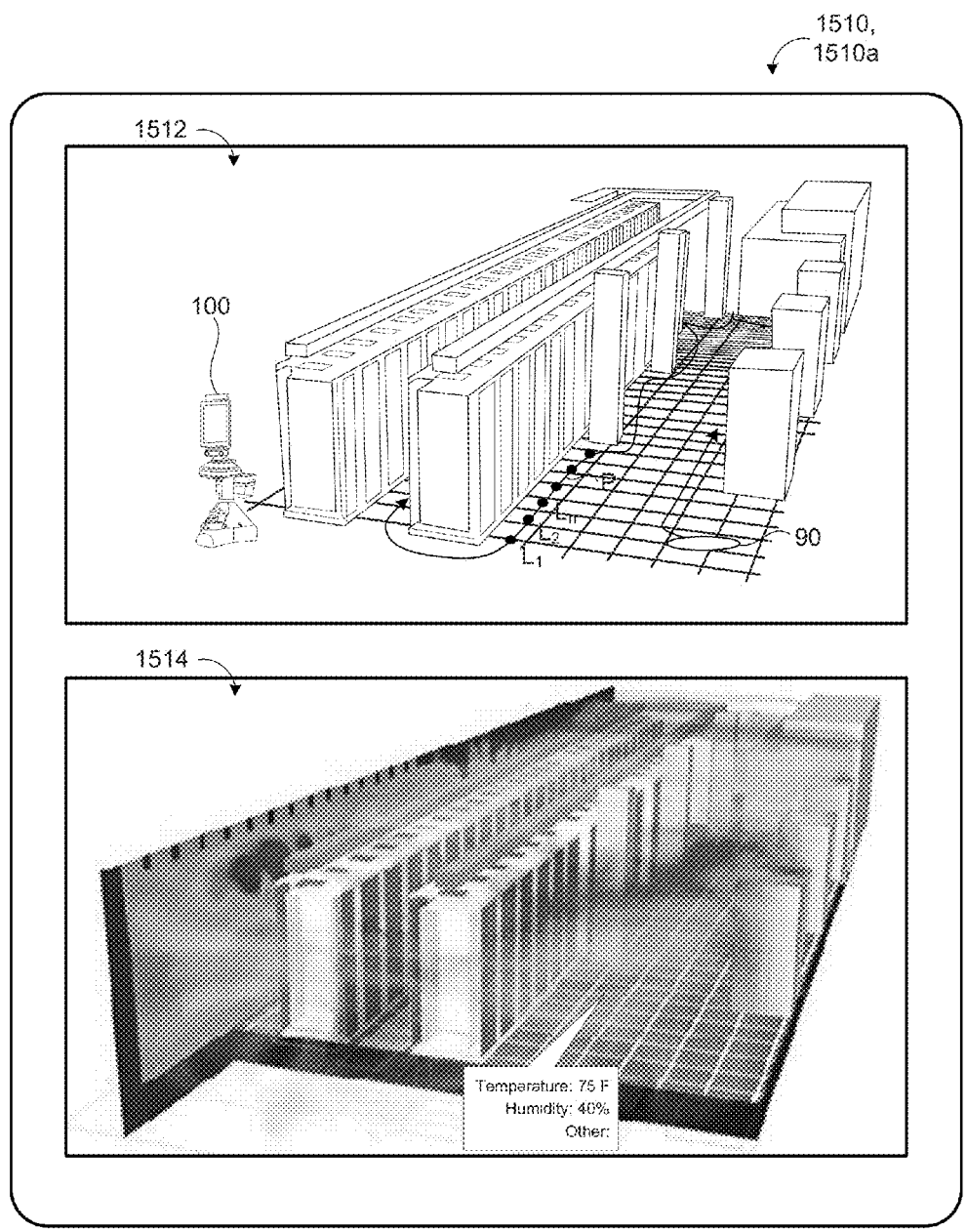
FIGS. 15B-15E are schematic views of exemplary environmental monitoring views of a monitoring application.

Referring to FIG. 15B, a first monitoring view 1510a may include a 3D model 1512 (or picture or video) of the robot environment (e.g., a data center), which may include a drive path P of the robot 100 and/or data collection locations $L_n$. In the case of the picture or video, the first monitoring view 1510a may include an augmented overlay thereon (e.g. augmented reality), so that the user can appreciate an actual view of the robot environment along with associated data. The user may modify the drive path P of the robot 100, for example, to veer clear of an RF sensitive area even though there are no actual physical obstacles. Moreover, the user may manage the data collection locations $L_n$, by assigning, removing, and/or moving the locations $L_n$. In some examples, the user can set the scanning height(s) at each data collection locations $L_n$. The first monitoring view 1510a may include a 3D data view 1514, which provides 3D rendering of the robot environment with overlaid data, such as temperature (e.g., a thermal image), humidity, and/or airflow in their corresponding collection locations $L_n$. In the example shown, the 3D data view 1514 provides a color gradient illustrating temperature changes and air flow direction indicators 1516. The 3D data view 1514 may illustrate humidity ranges (or any other sensor data value) using color gradients, icons, mouse-over icons, data grids, etc.

Figure 15C:
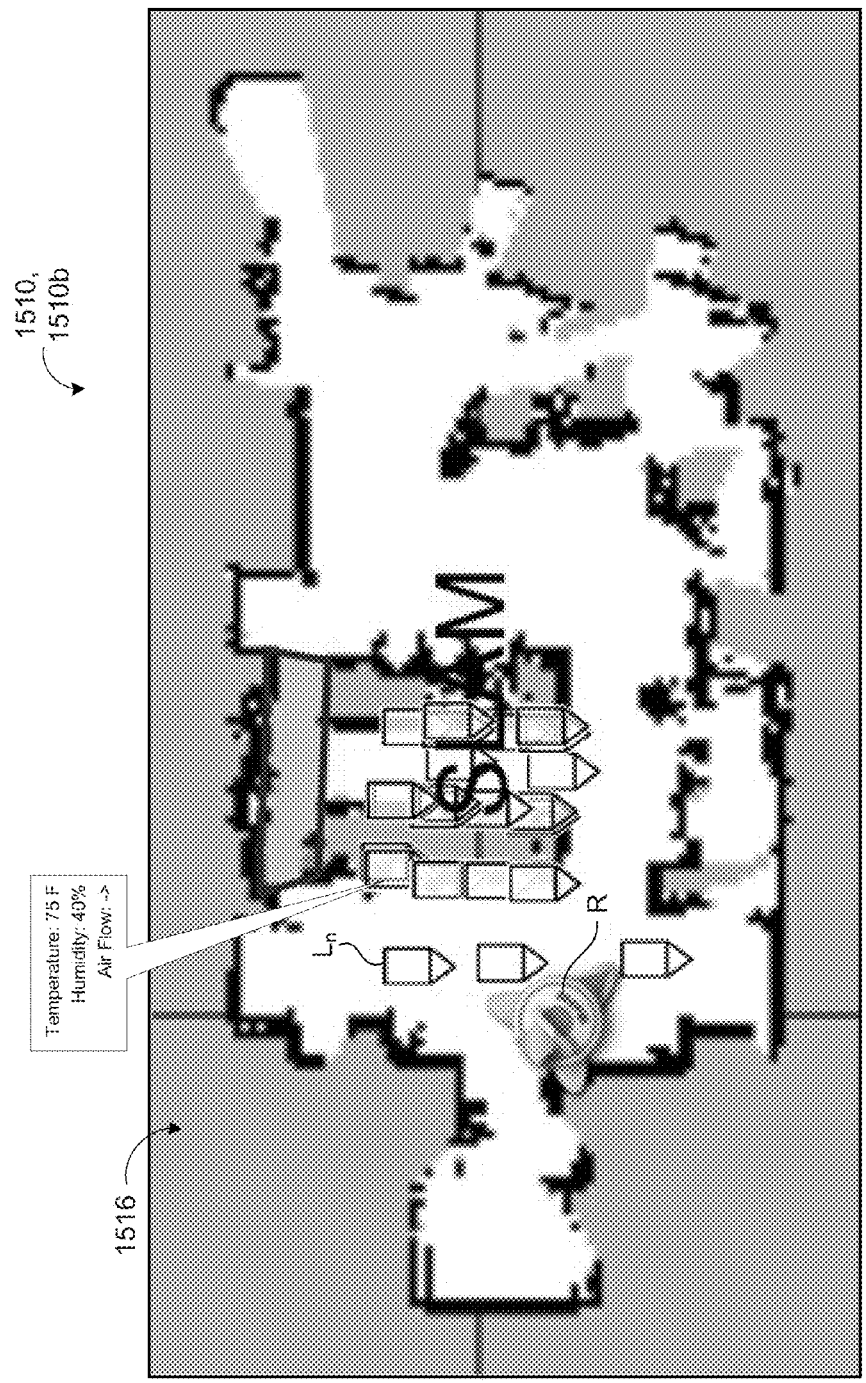
Figure 15D:
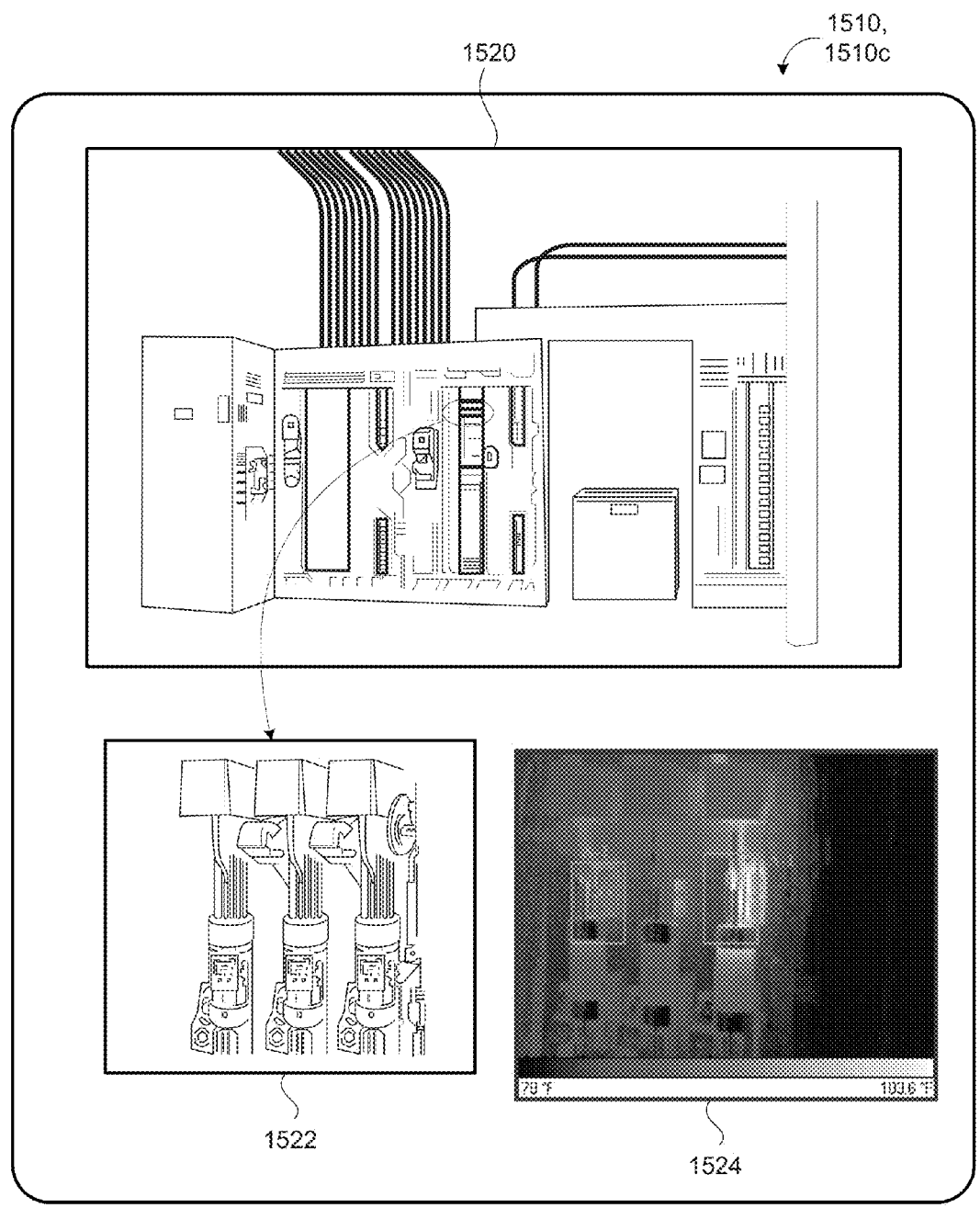

Referring to FIG. 15C, a second monitoring view 1510b may include a 2D view 1516 of the robot environment. In some examples, the 2D view 1516 is a layout map, while in other examples the 2D view 1516 is a robot generated map, such as the one shown. The robot generated map 1516 may be based on simultaneous localization and mapping (SLAM) routine(s) executed by the controller 200. The 2D view 1516 may include the data collection locations $L_n$ as well as the robot location R. The user may select a data collection location $L_n$ (e.g., by mouse-over, mouse click, etc.) to view data associated with that location $L_n$.

Referring to FIG. 15I), in some implementations, the monitoring application 1500 provides a third monitoring view 1510c that allows the user to set targets $T_n$ for data collection and/or view data of specific targets $T_n$. The third monitoring view 1510c may provide an illustration 1520 (e.g., rendering or picture) of a collection location $L_n$. The user may assign or modify targets $T_n$ at the location $L_n$. Moreover, the user may select a target $T_n$ to view a close-up view 1522 (e.g., rendering or picture) and optionally an associated thermal image 1524 to assess a temperature or likelihood of arc flashing, for example.

Figure 15E:
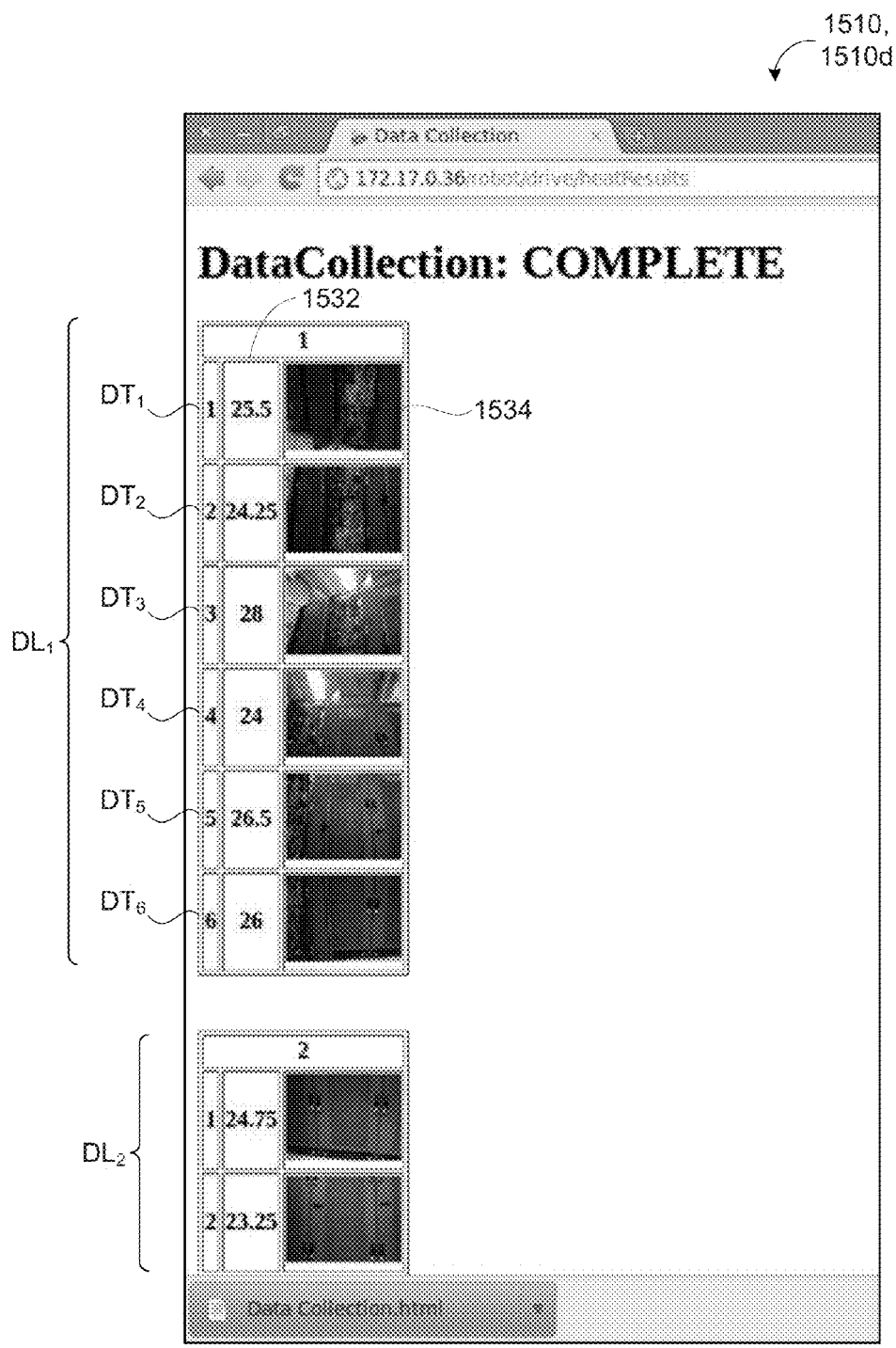

FIG. 15E illustrates an exemplary fourth monitoring view 1510d which provides collection of data (location datasets $DT_n$ and target datasets $DT_n$) acquired by the robot 100. The data can be grouped by location $L_n$ and target $T_n$. In the example shown, the first data collection location $L_1$ has a dataset $DL_1$ that includes six data targets $DT_{1-6}$. Each data target $DT_n$ may include a data value 1532 (e.g., temperature, humidity, etc.) and/or an associate image 1534 (e.g., visual, infrared, etc.). The monitoring application 1500 may display the images 1534 as thumbnails and expand them when selected.

The monitoring application 1500 may allow a user to program or navigate the robot 100, view collected data, and/or identify adverse trends for correction. For example, the user can monitor location specific environmental data and/or averages, trends, etc. Moreover, the user can analyze thermal images at each target $T_n$ to assess safety issues and other potential problems. The monitoring views 1510 can provide a profile of the robot's environment (e.g., a building) in terms of temperature distribution or other detectable attribute, allowing the user to identify problem locations and trends.

Figure 16:
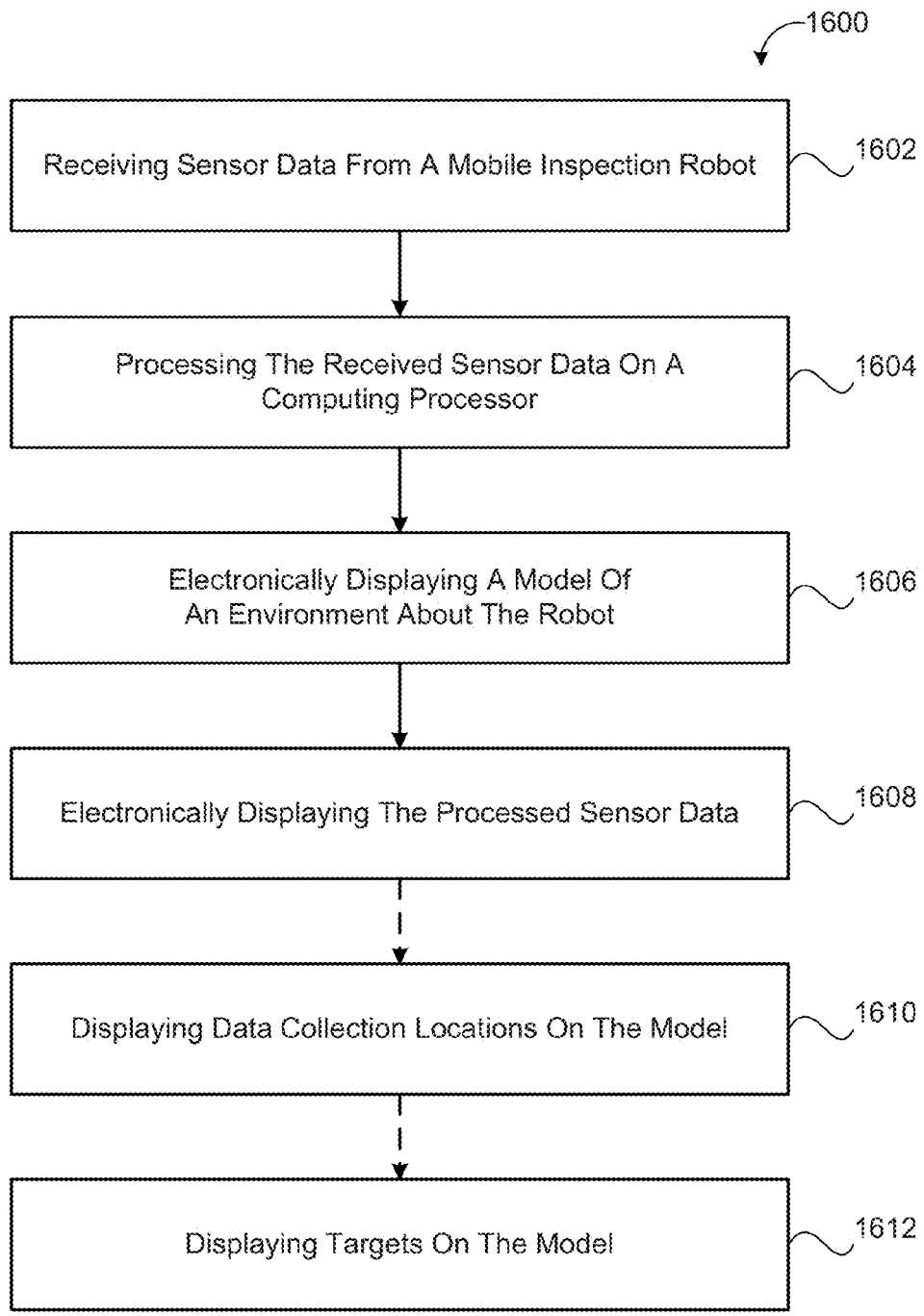
FIG. 16 provides an exemplary arrangement of operations for a method of monitoring environmental parameters.

FIG. 16 provides an exemplary arrangement 1600 of operations for a method of monitoring environmental parameters. The method includes receiving 1602 sensor data from a mobile inspection robot 100 and processing 1604 the received sensor data on a computing processor 200, 565, 1170, 1210, 1502. The method includes electronically displaying 1606 a model 1512 of an environment about the robot 100 and electronically displaying 1608 the processed sensor data 1522.

In some implementations, the sensor data 1522 includes at least one of temperature, humidity, air flow, or an image 1524. The model 1512 may be a three-dimensional model, a picture, video and/or a robot generated map 1516. The method may include displaying the processed sensor data 1522 as an augmented overlay on the model 1512.

The method may include displaying 1610 data collection locations $L_n$ on the model 1512, where the data collection locations $L_n$ are drive locations of the robot 100. Moreover, the method may include displaying 1612 one or more targets $T_n$ on the model for each data collection location $L_n$. Each target $T_n$ may have a different height with respect to the work surface. The method may include displaying sensor data 1522 associated with the one or more targets $T_n$ of a data collection location $L_n$ upon receiving a selection event (e.g., mouse-click, mouse-over, touch selection, etc.) corresponding to that data collection location $L_n$. Moreover, the method may include displaying sensor data 1522 associated with a target $T_n$ upon receiving a selection event corresponding to that target $T_n$.

Although various implementations may be discussed with reference to a data center, the robot 100 and methods of operating the robot 100 may apply to any environment or building in need of environmental monitoring (e.g., air quality control). For example, the robot 100 may operate in any environment or building needing monitoring of environmental factors for compliance to a standard, for operational reasons or for satisfying a customer delivery. For heating ventilation and cooling (HVAC) installations, the robot 100 may be used to monitor and/or check the temperature, humidity, and/or air flow distribution in a building, for example, before hand-over to a customer. Hospitals may use the robot 100 to monitor and maintain environmental factors, such as air quality, for patient comfort and safety. The robot 100 may monitor clean rooms for measuring/mapping air flow and particulate levels, food storage rooms for measuring/mapping temperature and/or contamination, basements for measuring/mapping carbon monoxide and/or radon, nuclear power plants for measuring/mapping radiation levels, and other environments.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A mobile inspection robot comprising:
a robot body;
a drive system supporting the robot body and configured to maneuver the robot over a work surface;
an arm disposed on the robot body;
a controller in communication with the drive system and executing a control system, the controller configured to:
obtain a layout map of a data center; and
obtain scanning locations of the data center, each scanning location associated with at least one scanning height; and
a sensor system in communication with the controller, the sensor system comprising at least one scanner payload disposed on the arm, the at least one scanner payload comprising a temperature sensor;
wherein the control system comprises a control arbitration system and a behavior system in communication with each other, the behavior system executing an inspection behavior, the inspection behavior configured to influence execution of commands by the control arbitration system based on sensor signals received from the sensor system to:
issue drive commands to the drive system based on the layout map to autonomously maneuver the mobile inspection robot to at least one scanning location of the data center;
obtain at least one temperature reading using the temperature sensor of the at least one scanner payload at the at least one scanning height associated with the at least one scanning location; and
output a three-dimensional model of the data center to a display system in communication with the controller, the three-dimensional model including an augmented overlay of the obtained at least one temperature reading at the corresponding at least one scanning location, and
wherein the inspection behavior causes the mobile inspection robot to:
identify electrical equipment as an inspection target; and
obtain at least one sensor reading relative to the inspection target using the sensor system.

2. The mobile robot of claim 1, wherein the inspection behavior causes the robot to identify a navigation reference using the sensor system and maneuver relative to the navigation reference.

3. The mobile robot of claim 2, wherein the navigation reference comprises a visual fiducial.

4. The mobile robot of claim 2, wherein the inspection behavior causes the robot to identify electrical equipment using the navigation reference and execute an environmental scan on the identified electrical equipment.

5. The mobile robot of claim 1, wherein the inspection behavior causes the robot to:
identify at least one of a circuit breaker, a contactor, a motor control center, a fuse, a switch, a relay, a capacitor bank, an inverter, or a battery bank as the inspection target; and
obtain an image of the inspection target using a camera of the sensor system.

6. The mobile robot of claim 5, wherein the image comprises an infrared image.

7. The mobile robot of claim 1, wherein the inspection behavior causes the robot to:
identify at least one of a circuit breaker, a contactor, a motor control center, a fuse, a switch, a relay, a capacitor bank, an inverter, or a battery bank as the inspection target; and
obtain an ultrasound measurement of the inspection target using an ultrasound sensor of the sensor system.

8. The mobile robot of claim 1, further comprising:
an articulated arm having a pivot end pivotally coupled to the robot body and a distal end;
a racking actuator disposed on the distal end of the arm;
wherein the inspection behavior causes the robot to identify a circuit breaker using the sensor system, engage the identified circuit breaker with the racking actuator, and move the circuit breaker between a racked position and an unracked position.

9. The mobile robot of claim 8, wherein the racking actuator engages and turns a lead screw of the circuit breaker.

10. The mobile robot of claim 1, wherein the inspection behavior causes the robot to identify an actuator of a circuit breaker and actuate the circuit breaker actuator using an articulated manipulator arm disposed on the robot body and in communication with the controller.

11. The mobile robot of claim 10, wherein the circuit breaker actuator comprises a lever, the robot moving the manipulator arm and a gripper disposed on the manipulator arm to grasp and rotate the lever between open and closed positions.

12. The mobile robot of claim 10, wherein the circuit breaker actuator comprises a button, the robot moving the manipulator arm to toggle the button.

13. The mobile robot of claim 1, wherein the inspection behavior causes the robot to identify a switchgear panel and open the switchgear panel using an articulated manipulator arm disposed on the robot body and in communication with the controller.

14. The mobile robot of claim 1, wherein the inspection behavior causes the robot to:
identify a navigation reference using the sensor system;
maneuver to the at least one scanning location using the navigation reference; and
obtain at least one sensor reading using the sensor system of at least one target at the at least one scanning location.

15. The mobile robot of claim 14, wherein the at least one sensor reading comprises at least one of an infrared image, a visual image, temperature, or humidity.

16. The mobile robot of claim 14, wherein the inspection behavior causes the robot to associate collected sensor data with the scanning location.

17. The mobile robot of claim 16, wherein the inspection behavior causes the robot to store in memory the collected sensor data.

18. The mobile robot of claim 1, wherein the drive system comprises:
right and left driven tracks, each track trained about a corresponding front wheel rotatable about a front wheel axis defined by the robot body; and
right and left elongated flippers disposed on corresponding sides of the robot body and operable to pivot about the front wheel axis of the robot body, each flipper having a driven track trained about its perimeter.

19. The mobile robot of claim 1, wherein the drive system comprises holonomically driven wheels.

20. The mobile robot of claim 1, wherein the arm is movable with respect to the robot body and the inspection behavior is configured to direct movement of the arm to move the at least one scanner payload to different heights relative to the work surface to perform scans for parameters of interest.

21. The mobile robot of claim 1, wherein the sensor system comprises multiple scanner payloads disposed on the robot body or the arm at different heights with respect to the work surface.

22. A mobile inspection robot comprising:
a robot body;
a drive system supporting the robot body and configured to maneuver the robot over a work surface;
an adjustable mast disposed on the robot body and arranged substantially vertical with respect to the work surface;
at least one scanner payload disposed on the mast and configured to monitor environmental parameters about the mobile inspection robot;
a controller in communication with the drive system and the mast, the controller configured to:
obtain a layout map of a data center;
obtain scanning locations of the data center, each scanning location associated with at least one scanning height;
issue drive commands to the drive system based on the layout map to autonomously maneuver the mobile inspection robot to at least one scanning location of the data center;
adjust the adjustable mast to position the at least one scanner payload at the at least one scanning height associated with the at least one scanning location to monitor the environmental parameters about the mobile inspection robot; and
output a three-dimensional model of the data center to a display system in communication with the controller, the three-dimensional model including an augmented overlay of the monitored environmental parameters at the corresponding at least one scanning location,
wherein the control system comprises a control arbitration system and a behavior system in communication with each other, the behavior system executing an inspection behavior, the inspection behavior influencing execution of commands by the control arbitration system based on sensor signals received from the at least one scanner payload to identify electrical equipment and inspect the electrical equipment using the at least one scanner payload.

23. The mobile inspection robot of claim 22, wherein the mast has an extendible length, the controller causing the mast to move between a deployed position and a stowed position.

24. The mobile inspection robot of claim 23, wherein the controller moves the mast to the deployed position during a data collection mode and the stowed position during a rapid travel mode.

25. The mobile inspection robot of claim 22, wherein each scanner payload comprises at least one of a temperature sensor, a humidity sensor, a visual camera, or an infrared camera.

26. The mobile inspection robot of claim 22, wherein the at least one scanner payload comprises a camera capable of panning and tilting with respect to the mast.

27. The mobile inspection robot of claim 22, wherein the at least one scanner payload is arranged at a height above the work surface of between about 0.5 ft. and about 8.5 ft.

28. The mobile inspection robot of claim 22, further comprising a first scanner payload disposed near a distal end of the mast and a second scanner payload disposed near a proximal end of the mast.

29. The mobile inspection robot of claim 28, further comprising a third scanner payload disposed on the mast between the first and second scanner payloads.

30. The mobile inspection robot of claim 22, further comprising multiple scanner payloads arranged along the mast in about 2 ft. increments.

\* \* \* \* \*

UNITED STATES PATENT AND TRADEMARK OFFICE
CERTIFICATE OF CORRECTION

PATENT NO.       : 9,463,574 B2
APPLICATION NO.  : 13/766125
DATED            : October 11, 2016
INVENTOR(S)      : Purkayastha et al.

Page 1 of 1

It is certified that error appears in the above-identified patent and that said Letters Patent is hereby corrected as shown below:

In the Specification

Column 15, Line 29: delete "movement OR" and insert -- movement $\theta_R$ --

Column 16, Line 1: delete "in 21)" and insert -- in 2D --

Signed and Sealed this
Twenty-fifth Day of April, 2017

Michelle K. Lee
*Director of the United States Patent and Trademark Office*